United States Patent
LaSota et al.

(10) Patent No.: US 11,686,579 B2
(45) Date of Patent: *Jun. 27, 2023

(54) LEVEL WITH MAGNETIC COUPLING

(71) Applicant: Milwaukee Electric Tool Corporation, Brookfield, WI (US)

(72) Inventors: Richard J. LaSota, Pewaukee, WI (US); Timothy Allen Schultz, New Berlin, WI (US); Christopher Frederick Boehme, Pewaukee, WI (US); Adam Christopher Resnick, Cambridge, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 100 days.

This patent is subject to a terminal disclaimer.

(21) Appl. No.: 17/342,041

(22) Filed: Jun. 8, 2021

(65) Prior Publication Data

US 2021/0293539 A1 Sep. 23, 2021

Related U.S. Application Data

(63) Continuation of application No. 16/399,433, filed on Apr. 30, 2019, now Pat. No. 11,054,257, which is a continuation of application No. 15/271,045, filed on Sep. 20, 2016, now Pat. No. 10,317,209, which is a continuation of application No. PCT/US2016/052475, filed on Sep. 19, 2016.

(60) Provisional application No. 62/221,257, filed on Sep. 21, 2015, provisional application No. 62/293,595, filed on Feb. 10, 2016.

(51) Int. Cl.
*G01C 9/28* (2006.01)

(52) U.S. Cl.
CPC .................................. *G01C 9/28* (2013.01)

(58) Field of Classification Search
None
See application file for complete search history.

(56) References Cited

U.S. PATENT DOCUMENTS

| | | | |
|---|---|---|---|
| 2,535,791 | A | 12/1950 | Fluke |
| 3,499,225 | A | 3/1970 | Darrah |
| 3,832,782 | A | 9/1974 | Johnson et al. |
| 4,593,475 | A | 6/1986 | Mayes |
| 4,970,796 | A | 11/1990 | Masters et al. |
| 5,575,073 | A | 11/1996 | von Wedemayer |
| 5,755,037 | A | 5/1998 | Stevens |
| 6,026,581 | A | 2/2000 | Gruetzmacher |

(Continued)

FOREIGN PATENT DOCUMENTS

| | | |
|---|---|---|
| CN | 2400781 Y | 10/2000 |
| CN | 2769852 Y | 4/2006 |

(Continued)

OTHER PUBLICATIONS

International Search Report and Written Opinion for PCT/US2016/052475 dated Nov. 21, 2016, 16 pages.

*Primary Examiner* — Christopher W Fulton
(74) *Attorney, Agent, or Firm* — Reinhart Boerner Van Deuren s.c.

(57) ABSTRACT

A tool, such as a level, including one or more magnetic coupling device is provided. The magnetic coupling device may be a magnetic circuit including metal components surrounding a magnet, such as a permanent rare-earth magnet.

20 Claims, 11 Drawing Sheets

(56) References Cited

U.S. PATENT DOCUMENTS

| | | |
|---|---|---|
| 6,029,360 A | 2/2000 | Koch |
| 6,032,376 A | 3/2000 | Shurtleff |
| 6,173,502 B1 | 1/2001 | Scarborough |
| 6,532,676 B2 | 3/2003 | Cunningham |
| 6,568,095 B2 | 5/2003 | Snyder |
| 6,675,490 B1 | 1/2004 | Krehel et al. |
| 6,834,435 B2 | 12/2004 | Turner |
| 7,028,413 B2 | 4/2006 | Filipescu |
| 7,086,166 B2 | 8/2006 | Heida et al. |
| 7,089,676 B2 | 8/2006 | Godinez |
| 7,117,606 B2 | 10/2006 | Brown |
| 7,137,209 B2 | 11/2006 | Northern et al. |
| 7,152,335 B2 | 12/2006 | Nichols |
| 7,204,029 B2 | 4/2007 | Tran et al. |
| 7,316,074 B2 | 1/2008 | Tran et al. |
| 7,398,600 B2 | 7/2008 | Ming |
| 7,406,773 B2 | 8/2008 | Heida |
| 7,520,065 B2 | 4/2009 | Vernola |
| 7,536,798 B2 | 5/2009 | Silberberg |
| 7,552,540 B2 | 6/2009 | Ming |
| 7,565,749 B2 | 7/2009 | Heida |
| 7,568,292 B2 | 8/2009 | Maruyama |
| 7,644,506 B2 | 1/2010 | Wong |
| 7,802,371 B2 | 9/2010 | Ming |
| 7,913,406 B2 | 3/2011 | Norelli |
| 7,963,044 B1 | 6/2011 | Bartholomew |
| 8,006,397 B2 | 8/2011 | Schubert |
| 8,061,051 B2 | 11/2011 | Allemand |
| 8,413,342 B2 | 4/2013 | Christianson |
| 8,458,917 B1 | 6/2013 | Pankow |
| 8,484,856 B1 | 7/2013 | Webb et al. |
| 8,910,390 B2 | 12/2014 | Steele et al. |
| 8,914,987 B2 | 12/2014 | Sanchez |
| 9,021,710 B2 | 5/2015 | Silberberg |
| 10,317,209 B2 | 6/2019 | Lasota |
| 11,054,257 B2 * | 7/2021 | LaSota .................... G01C 9/28 |
| 2003/0005590 A1 | 1/2003 | Snyder |
| 2005/0016007 A1 | 1/2005 | Schaefer |
| 2007/0028472 A1 | 2/2007 | Brown |
| 2008/0110038 A1 | 5/2008 | Sergyeyenko |
| 2008/0263880 A1 | 10/2008 | Hess |
| 2012/0222321 A1 | 9/2012 | Christianson |
| 2013/0091717 A1 | 4/2013 | Steele et al. |
| 2013/0305548 A1 | 11/2013 | Lueck et al. |
| 2014/0007438 A1 | 1/2014 | Silberberg |
| 2014/0007439 A1 | 1/2014 | Silberberg |
| 2014/0373371 A1 | 12/2014 | Silberberg |
| 2015/0096182 A1 | 4/2015 | Silberberg |
| 2015/0113819 A1 | 4/2015 | Silberberg |
| 2015/0160008 A1 | 6/2015 | Silberberg |
| 2017/0314949 A1 | 11/2017 | Rovik et al. |
| 2018/0010912 A1 | 1/2018 | Captarencu |

FOREIGN PATENT DOCUMENTS

| | | |
|---|---|---|
| CN | 2844848 Y | 12/2006 |
| CN | 201340266 Y | 11/2009 |
| CN | 202046090 U | 11/2011 |
| CN | 102278976 A | 12/2011 |
| CN | 202255381 U | 5/2012 |
| CN | 202304822 U | 7/2012 |
| CN | 202511789 U | 10/2012 |
| CN | 202734819 U | 2/2013 |
| CN | 203177850 U | 9/2013 |
| CN | 203241049 U | 10/2013 |
| CN | 203364822 U | 12/2013 |
| CN | 203758507 U | 8/2014 |
| CN | 104132648 A | 11/2014 |
| CN | 203949671 U | 11/2014 |
| CN | 204301732 U | 4/2015 |
| CN | 204461419 U | 7/2015 |
| EP | 0919786 | 6/1999 |
| EP | 0852697 B1 | 11/2001 |
| JP | 11-183169 | 7/1999 |
| JP | 11173843 | 7/1999 |
| JP | 2014095683 | 5/2014 |
| TW | M436831 | 9/2012 |

* cited by examiner

LEVEL WITH MAGNETIC COUPLING

CROSS-REFERENCE TO RELATED PATENT APPLICATION

This application is a continuation of application Ser. No. 16/399,433, now U.S. Pat. No. 11,054,257, filed Apr. 30, 2019, which is a continuation of Ser. No. 15/271,045, now U.S. Pat. No. 10,317,209, filed Sep. 20, 2016, which is a continuation of International Application No. PCT/US2016/052475, filed on Sep. 19, 2016, which claims the benefit of and priority to U.S. Provisional Application No. 62/221,257, filed on Sep. 21, 2015, and U.S. Provisional Application No. 62/293,595, filed on Feb. 10, 2016, which are incorporated herein by reference in their entireties.

BACKGROUND OF THE INVENTION

The present invention relates generally to the field of tools. The present invention relates specifically to a tool, such as a level, a spirit level, a billet torpedo type level, a block torpedo type level, etc., with one or more magnetic components configured to couple the level to a magnetic structure or workpiece. Levels, such as spirit levels, are used to determine the levelness of a structure, surface or workpiece. In use the level is placed on or in contact with a surface to be measured, and the user views the location of a bubble within a vial relative to markings that indicate the levelness of the structure, surface or workpiece.

SUMMARY OF THE INVENTION

One embodiment of the disclosure relates to a tool, specifically a level, including a magnetic coupling element located to direct a magnetic coupling field through or beyond a surface of the tool. In various embodiments, the tool is a level and the surface is a planar base surface of the level configured to engage a surface of a workpiece.

In various embodiments, the level includes a level body formed from a first metal material, and the magnetic coupling element is a magnetic circuit including a magnet located adjacent to at least one metallic structure that is formed from a second metal material that is different from the first metal material. In various embodiments, the magnet of the magnetic circuit is located between a pair of metallic structures and the magnetic circuit is coupled to the level body. In some such embodiments, each of the metallic structures includes an outward facing surface that engages an interior surface of the level body and an inward facing surface that engages an outer surface of the magnet. In some such embodiments, the engagement between the surfaces of the level body and the metallic structures form a press fit that holds the magnetic circuit within the level body. In some such embodiments, at least portions of the surfaces of the level body and the metallic structures that form a press fit are vertical surfaces.

In various embodiments, a height of the magnet is less than the height of the at least one metallic structure such that the magnet is recessed below the at least one metallic structure within the level body. In various embodiments, the at least one metallic structure is formed from steel and the magnet is a rare-earth magnet.

In various embodiments, an outer surface of the magnet and an outer surface of the at least one metallic structure are shaped to engage and interlock with each other. In various embodiments, an outer lateral surface of the magnet is a non-vertical surface and an outer lateral surface of the at least one metallic structure is a non-vertical surface that engage each other. In various embodiments, the outer lateral surface of the magnet is an angled surface, and the magnet includes an upper surface. In such embodiments, a maximum width of the angled surface of the magnet is greater than a maximum width of the upper surface.

In various embodiments, the level includes more than one discrete magnetic circuit spaced along or relative to a planar base surface. In various embodiments, the magnetic circuit is elongated such that the magnetic circuit extends at least 30% of the longitudinal length of the level. In various embodiments, the level may include an elongate groove or channel formed in the body, and the magnetic circuit is located in the elongate groove or channel. In various embodiments, the magnet has a north-south axis that is substantially parallel to the planar base surface. In some such embodiments, the north-south axis of the magnet is substantially parallel to the longitudinal axis of the level body, and in other embodiments, the north-south axis of the magnet is substantially parallel to the width axis of the level body.

Another embodiment of the disclosure relates to a level. The level includes a level body formed from a first metallic material, and the level body defines a base surface configured to engage a workpiece. The level includes at least one level vial located within the level body and a cavity located in the level body defining an opening along the base surface. The level includes a magnetic circuit coupled to the level body within the cavity. The magnetic circuit includes a pair of metallic structures formed from a second metallic material. The second metallic material is a ferromagnetic material and is different from the first metallic material. The magnetic circuit includes a permanent magnet located between opposing inner surfaces of the pair of metallic structures.

Another embodiment of the disclosure relates to a leveling device configured to measure levelness of a workpiece. The leveling device includes a level body having a planar base surface and defines a longitudinal axis. The leveling device includes at least one level vial located within the level body. The leveling device includes a magnetic coupling element supported by the level body such that a magnetic field generated by the magnetic coupling element extends outward from the base surface, and the magnetic coupling element has north-south axis. The magnetic coupling element is positioned relative to the level body such that the north-south axis is positioned substantially parallel to the planar base surface and substantially perpendicular the longitudinal axis.

Another embodiment of the disclosure relates to a tool including a tool body formed from a first material and having a first surface. The tool including a magnetic coupling element supported by the tool body such that a magnetic field generated by the magnetic coupling element extends outward from the first surface. The magnetic coupling element includes a permanent magnet and a metallic sleeve structure at least partially surrounding the permanent magnet. The metallic sleeve structure is formed from a magnetic material that is different from the first material and has a magnetic reluctance that is less than a magnetic reluctance of the first material.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Referring generally to the figures, various embodiments of a level are shown. In general, the levels discussed herein include one or more level vials and a level base. As will be generally understood, the base of the level is placed on a workpiece (e.g., a structure, surface, etc.) in order for the user of the level to measure the levelness of a surface of a structure. The level embodiments discussed herein include one or more magnetic coupling elements located along the base that facilitate attachment, via magnetic attraction, of the level to the magnetic (e.g., a ferromagnetic) workpiece. In various embodiments discussed herein, the level includes a magnetic coupling arrangement that increases the magnetic coupling force generated by the magnetic coupling element. For example, in some embodiments, the north-south axis of the magnet of the magnetic coupling element is aligned relative to the level base surface and/or to the magnetic workpiece (e.g., parallel to workpiece surface and/or level base) to increase the level of magnetic coupling force.

In addition, in specific embodiments, one or more of the magnetic coupling elements are formed as a magnetic circuit in which a permanent magnet is located between or is surrounded by components (e.g., steel or iron sleeves) formed from a material having low magnetic reluctance. As will be understood, the low reluctance material of the magnetic circuit acts to focus/guide the magnetic field generated by the permanent magnet toward the workpiece and thereby increases the amount of magnetic coupling force generated by the permanent magnet. Applicant believes that by utilizing the magnetic circuits and/or permanent magnet orientations discussed herein, the amount of magnetic coupling force generated by a permanent magnet of particular size and material is increased.

In addition, Applicant has found that some permanent magnet materials (e.g., rare-earth magnet materials) tend to be brittle, resulting in cracking, crumbling, etc., during certain assembly processes. In at least some embodiments, the magnetic circuit arrangements discussed herein facilitate assembly of the magnetic circuit into the level body by providing one or more engagement surfaces spaced from the permanent magnet which may be contacted during assembly. In such embodiments, as the magnetic circuit is seated within the level body, the force necessary to press the magnetic circuit into the level body may be applied by the engagement surface such that direct contact with the permanent magnet during seating can be avoided. In specific embodiments, the engagement surface may be a surface of one of the metal sleeves of the magnetic circuit. As such, in some embodiments, the magnetic circuit arrangements discussed herein limit the need for direct contact with the permanent magnet component during assembly, which in turn limits the risk of damaging the permanent magnet.

Figure 1:
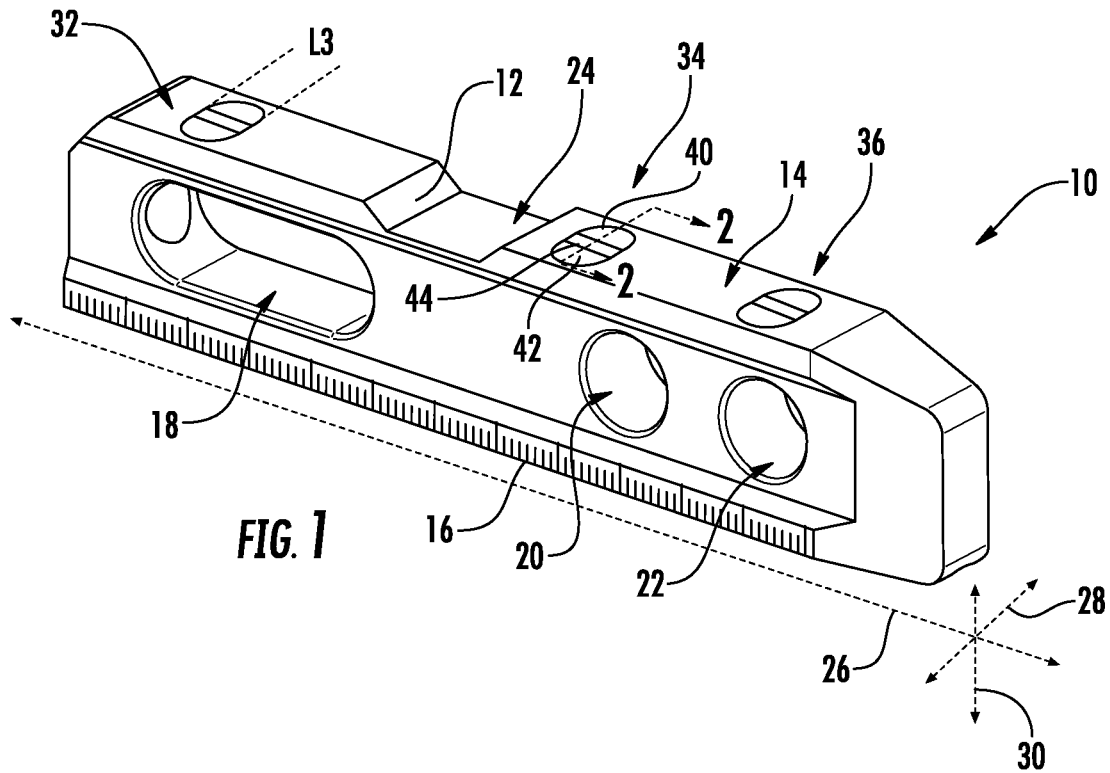
FIG. 1 is a perspective view of a level, according to an exemplary embodiment.

Referring to FIG. 1, a leveling device, shown as level 10, is shown according to an exemplary embodiment. In general, level 10 includes a body 12 that includes a base surface 14 and an opposing surface 16. As will be explained in more detail below, base surface 14 is a flat, planar surface that engages a surface of a workpiece to be measured using level 10. In at least some embodiments, body 12 is formed from an extruded metal material (e.g., extruded aluminum). In some specific embodiments, base surface 14 is machined to have a flat, flush or planar surface following extrusion, and in some embodiments, this machined surfaced may be anodized.

Level 10 includes a plurality of through bores formed through body 12. As shown in FIG. 1, level 10 includes an enlarged opening 18, a first vial receiving opening 20 and a second vial receiving opening 22. Level 10 includes a recess 24 located adjacent base surface 14. As will be understood, openings 20 and 22 and recess 24 receive three standard level vials (e.g., bubble vials) which are held in the appropriate orientation relative to base surface 14 in order for the vials to indicate the levelness of the corresponding surface of a workpiece. In various embodiments, enlarged opening 18 receives a large level vial. In other embodiments, enlarged opening 18 may provide a hand hold. As shown in FIG. 1, body 12 of level 10 generally defines a longitudinal axis 26, a width axis 28 and a height axis 30. Openings 18, 20 and 22 each define an axis extending between the left and right sides of level 10 such that openings 18, 20 and 22 are substantially perpendicular to longitudinal axis 26. In the specific embodiment shown, level 10 is a billet torpedo level.

Level 10 includes one or more magnetic coupling elements, shown as magnetic circuits 32, 34 and 36. In general, magnetic circuits 32, 34 and 36 generate a magnetic coupling force that allows level 10 to be attached to and held in place to a surface of a magnetic workpiece. In the embodiment shown in FIG. 1, level 10 includes three discrete magnetic circuits spaced along base surface 14. In other embodiments, level 10 may include other numbers of magnetic circuits (e.g., 1, 2, 4, 5, 6, etc.). Further, in the embodiment shown, each of magnetic circuits 32, 34 and 36 has the same structure as each other, but in other embodiments, the structure of one or more magnetic circuits may be different from the others.

Figure 2:
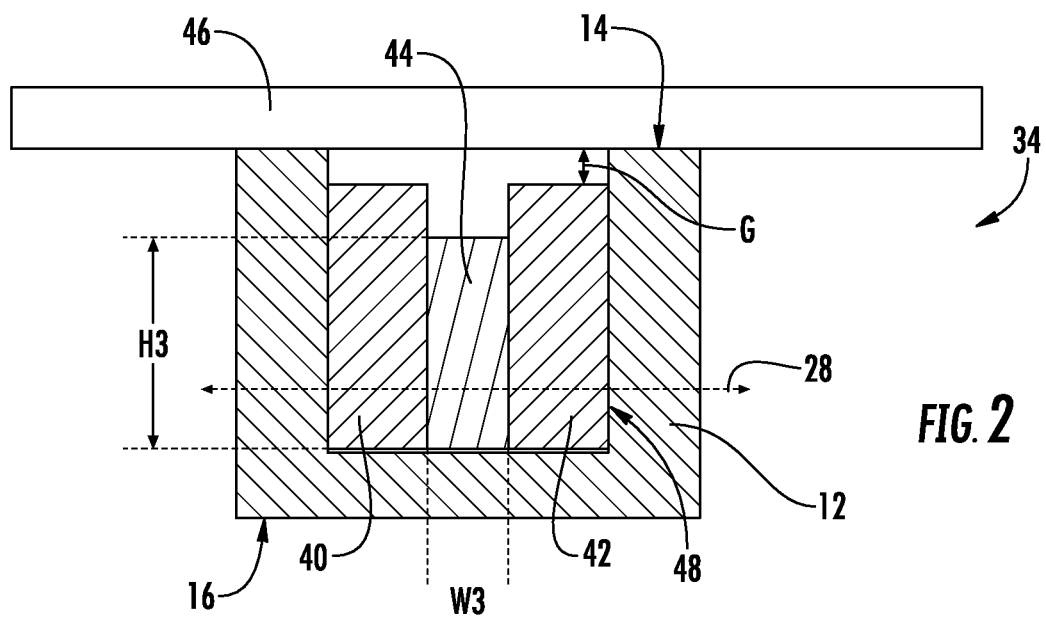
FIG. 2 is a schematic cross-sectional view of the level of FIG. 1, according to an exemplary embodiment.

Referring to FIG. 1 and FIG. 2, details of magnetic circuits 32, 34 and 36 are explained herein, in reference to central magnetic circuit 34, with the understanding that the other magnetic circuits 32 and 36 are formed in substantially the same manner and configured in the same manner as central magnetic circuit 34. Central magnetic circuit 34 includes a pair of metallic structures, posts, blocks or sleeves, shown as left sleeve 40 and right sleeve 42, located on either side of permanent magnet 44.

Figure 3:
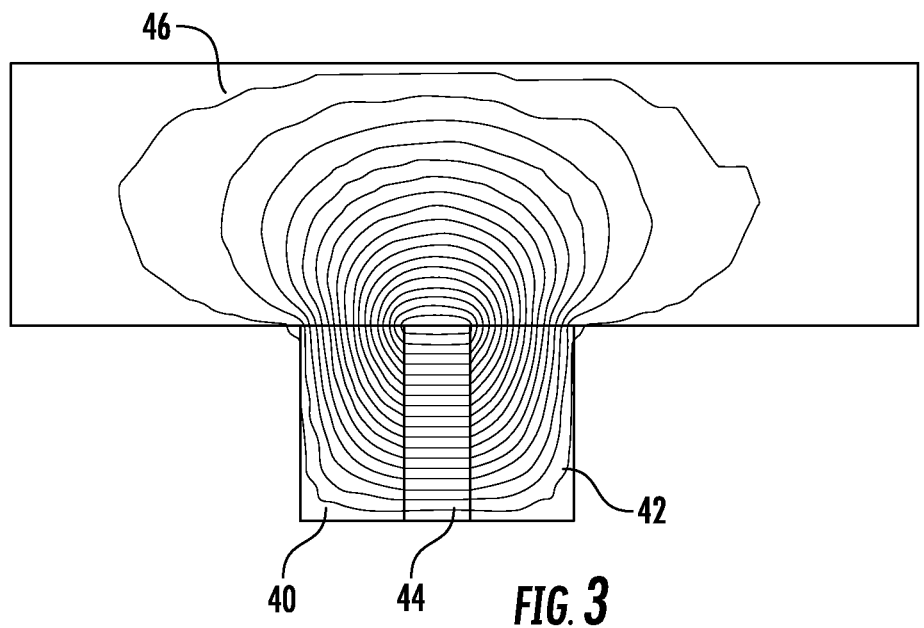
FIG. 3 is a schematic cross-sectional view showing the magnetic field of a magnetic circuit, according to an exemplary embodiment.

Referring to FIG. 2 and FIG. 3, in operation, level 10, including magnetic circuits 32, 34 and 36, may be coupled or attracted to magnetic workpiece 46 (e.g., a pipe) via the magnetic field generated by magnet 44. FIG. 3 is a schematic diagram showing the operation of a magnetic circuit, such as circuit 34, according to an exemplary embodiment. In various embodiments, because sleeves 40 and 42 are formed from a low reluctance material (e.g., steel), sleeves 40 and 42 act to guide/focus the magnetic field generated by magnet 44 into workpiece 46 as shown in FIG. 3. By placing the low reluctance material of sleeves 40 and 42 in close proximity/contact with magnet 44, the magnetic field of magnet 44 is channeled through sleeves 40 and 42 in a way that increases the magnetic coupling force generated by a magnet 44 given a particular magnet size, weight, material type, etc. This is represented by the increased density of the magnetic flux lines shown in FIG. 3.

Further, by utilizing the magnetic circuit arrangements discussed herein, the amount of magnetic material needed to form magnet 44 to achieve a certain level of magnetic coupling force (e.g., greater than 8 lbs., greater than or equal to 10 lbs., etc.) may be decreased relative to a magnet arrangement that does not utilize sleeves 40 and 42. As will be understood, the thickness of sleeves 40 and 42 is selected to be low enough that the sleeves do not reach saturation, but instead guide the magnetic field as shown in FIG. 3. In particular embodiments, the thickness and/or shape of sleeves 40 and 42 is selected to densify the magnetic flux (which increases magnetic coupling force at base surface 14) emanating from the magnetic circuits away from base surface 14 given a magnet of a particular size, shape, material type, etc. In some such embodiments, the thickness and/or shape of sleeves 40 and 42 achieves the desired magnetic properties while also reducing or minimizing the amount of steel material needed to form sleeves 40 and 42.

In addition, Applicant has found that by positioning the north-south axis of magnet 44 relative to base surface 14, workpiece 46, and/or the width axis 28 of level 10, magnetic coupling force can be controlled, selected, increased etc. relative to at least some other north-south axis alignments. For example, as shown in FIG. 2 and FIG. 3, in various embodiments, the north-south axis of magnet 44 is substantially parallel (e.g., within plus or minus 10 degrees of parallel) to base surface 14, and in a specific embodiment, the north-south axis of magnet 44 is substantially parallel (e.g., within plus or minus 10 degrees of parallel) to base surface 14 and is also perpendicular to longitudinal axis 26 of level 10. In other embodiments, magnetic circuit 34 may be positioned such that that the north-south axis of magnet 44 is parallel to base surface 14 and is also parallel to longitudinal axis 26 of level 10. In a specific embodiment, the north-south axis of magnet 44 is within plus or minus 1 degree of parallel to base surface 14.

In other embodiments, the north-south axis of magnet 44 is not perpendicular to base surface 14 and/or workpiece 46. In various embodiments, in the plan views shown in FIG. 2 and FIG. 3, the angle between the north-south axis of magnet 44 and width axis 28 is greater than or equal to 0 degrees and is less than or equal to 45 degrees, specifically is greater than or equal to 0 degrees and is less than or equal to 30 degrees, and more specifically is greater than or equal to 0 degrees and is less than or equal to 10 degrees.

In specific embodiments, Applicant has found that the north-south axis positioning in combination with the sleeve arrangement discussed herein provides for improved magnetic coupling to workpiece 46 (at least compared to some other magnet arrangements). In specific embodiments, the north-south axis of magnet 44 is substantially perpendicular to a vertical axis of sleeves 40 and 42. In such embodiments, this arrangement increases the portion of the magnetic field of magnet 44 that is allowed to interact with sleeves 40 and 42, which in turn improves the ability of sleeves to guide/focus the magnetic field.

Without wishing to be bound by a particular theory, Applicant believes that the function of the magnetic circuit arrangements discussed herein can be understood as follows. High reluctance material can be thought of as "less magnetic" material, such as plastic, aluminum or air. In a high reluctance material, magnetic energy is stored. Low reluctance materials are materials that are more magnetic, like metals, such as steel. Further, the flux paths of a magnet generally flow from the north pole of the magnet to the south pole of the magnet. As shown in FIG. 3, the flux paths pass from the north pole of magnet 44 through sleeve 40, into workpiece 46, back into sleeve 42 and into the south pole of magnet 44. In this arrangement, there is little or no high reluctance material (e.g., plastic, aluminum or air) along the flux paths from the magnet and into the workpiece, and thus all or substantially all of the magnetic field of magnet 44 is available for coupling to the workpiece rather than being stored within a high reluctance material.

Referring to FIG. 2, in various embodiments, level body 12 is configured to receive and hold the magnetic circuits of level 10. For example, sleeves 40 and 42 and magnet 44 are located within a cavity, or recess 48, formed in body 12. In this arrangement, lower surfaces of sleeves 40 and 42 and of magnet 44 are seated against a lower, upward facing surface of recess 48. In addition, the left side surface of sleeve 40 abuts and contacts the inward facing left surface of recess 48, and the right side surface of sleeve 40 abuts and contacts the outward facing left surface of magnet 44. Similarly on the opposite side of magnetic circuit 34, the right side surface of sleeve 42 abuts and contacts the inward facing right surface of recess 48, and the left side surface of sleeve 42 abuts and contacts the outward facing right surface of magnet 44. In some embodiments, body 12 is formed from a metal (e.g., aluminum) that is different from the metal material of sleeves 40 and 42 (e.g., steel), which are both different from the material of magnet 44 (e.g., a rare-earth magnet). In such embodiments, each of the interfaces discussed above represents an interface between different material types.

In some embodiments, magnetic circuits of level 10 are press fit into the corresponding receiving cavities (e.g., recess 48) within level body 12. In such embodiments, frictional forces between the outer surfaces of sleeves 40 and 42 and the inner surfaces of recess 48 act to hold magnetic circuit 34 into recess 48. In some such embodiments, adhesive or glue material is not included within recess 48 to hold magnetic circuit 34 in place. In some other embodiments, an adhesive material is located within recess 48 to hold magnetic circuit 34 in place.

Referring to FIG. 2, the magnetic circuits of level 10, such as circuit 34, are further configured to facilitate mounting of magnetic circuit 34 within recess 48 while protecting magnet 44 from damage during installation. In such embodiments, magnet 44 is sized such that magnet 44 is recessed below the outer most surfaces of sleeves 40 and 42 in the vertical direction. In this embodiment, an offset distance is located between the upper most surface of magnet 44 and the upper most surfaces of sleeves 40 and 42. In various embodiments, the offset distance is between 0 and 0.5 inches, and in another embodiment, the offset distance is between 0 and 1 inches. In at least some embodiments, the offset distance allows a downwardly directed vertical force to be applied to the upper surfaces of sleeves 40 and 42 during the step of press fitting magnetic circuit 34 into recess 48. This arrangement limits or eliminates contact with magnet 44 as magnetic circuit 34 is pressed into level 10. In particular embodiments, magnet 44 is formed from a rare-earth magnetic material that tends to be brittle, and the offset allows press fitting of magnetic circuit 34 while protecting magnet 44 from damage that may otherwise occur as a result of application of the forces during press fitting.

As shown in FIG. 2, sleeves 40 and 42 are also recessed below base surface 14 adjacent recess 48, creating an air gap G between upper most surfaces of sleeves 40 and 42 and the opposing surface of the workpiece 46. In various embodiments, the relative sizes of sleeves 40 and 42 and recess 48 are selected so that the height of air gap G is relatively small to improve/increase the amount of coupling force generated by magnetic circuit 34. In various embodiments the height of air gap G is less than 0.01 inches. In some embodiments, the relative sizes of sleeves 40 and 42 and recess 48 are selected so that the height of air gap G is greater than or equal to zero and less than or equal to 0.01 inches, and in a specific embodiment, air gap G is zero such that the upper surfaces of sleeves 40 and 42 are coplanar with base surface 14. In addition, as shown in FIG. 2, magnetic circuit 34 is uncovered (e.g., by a portion of level body 12) such that the outermost surfaces (shown as the upper surfaces in the orientation of FIG. 2) of the magnetic circuit 34 define a portion of the outermost surface of level 10 at the location of recess 48.

In various embodiments, sleeves 40 and 42, magnet 44 and recess 48 may be shaped and sized in various ways as desired to achieve various magnetic field properties and/or to accommodate various level designs. Referring to FIGS. 4-7, various sizes of recess 48 and of sleeve 40 are shown, with the understanding that the other recesses of level 10 are the same as recess 48 and that the sleeve 42 is the same as sleeve 40.

Figure 4:
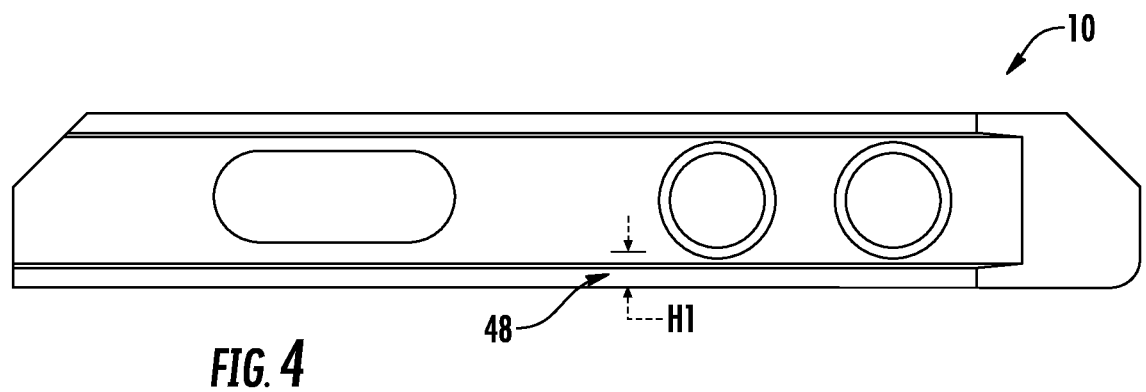
FIG. 4 is a side view of the level of FIG. 1, according to an exemplary embodiment.
Figure 5:
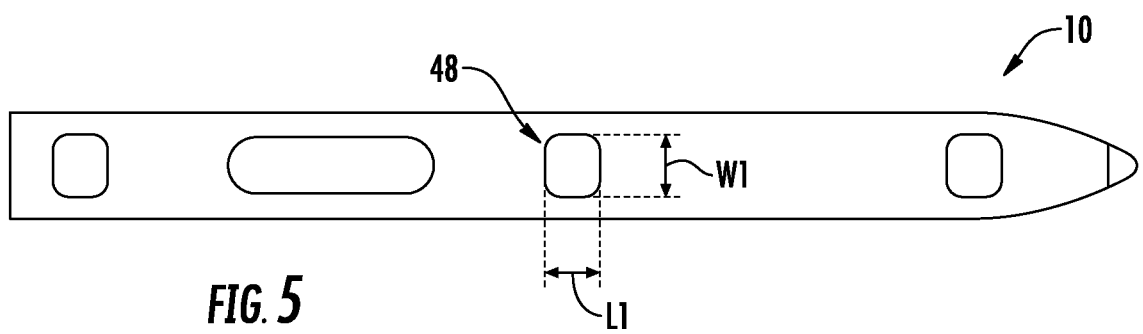
FIG. 5 is a top view of the level of FIG. 1, according to an exemplary embodiment.

As shown in FIG. 4, recess 48 has a height, H1, a length, L1 and a width, W1. In various embodiments, H1 is between 0.1 and 0.4 inches, specifically between 0.2 and 0.3 inches and more specifically about 0.26 inches (e.g., 0.26 inches plus or minus 0.005 inches). In various embodiments, L1 is between 0.2 and 0.6 inches, specifically between 0.3 and 0.4 inches and more specifically about 0.38 inches (e.g., 0.38 inches plus or minus 0.001 inches). In various embodiments, W1 is between 0.2 and 0.7 inches, specifically between 0.4 and 0.5 inches and more specifically about 0.43 inches (e.g., 0.43 inches plus or minus 0.005 inches). In specific embodiments, recess 48 has a volume that is between 0.01 inches$^3$ and 0.1 inches$^3$, specifically between 0.035 inches$^3$ and 0.05 inches$^3$, and more specifically between 0.04 inches$^3$ and 0.045 inches$^3$. In a specific embodiment, recess 48 has a volume of about 0.0425 inches$^3$. Applicant believes that recesses, as described herein, provide a combination of functionality including sufficient size to contain magnet 44 and sleeves 40 and 42, while also providing sufficient body support to provide press fit friction within level body 12.

Figure 6:
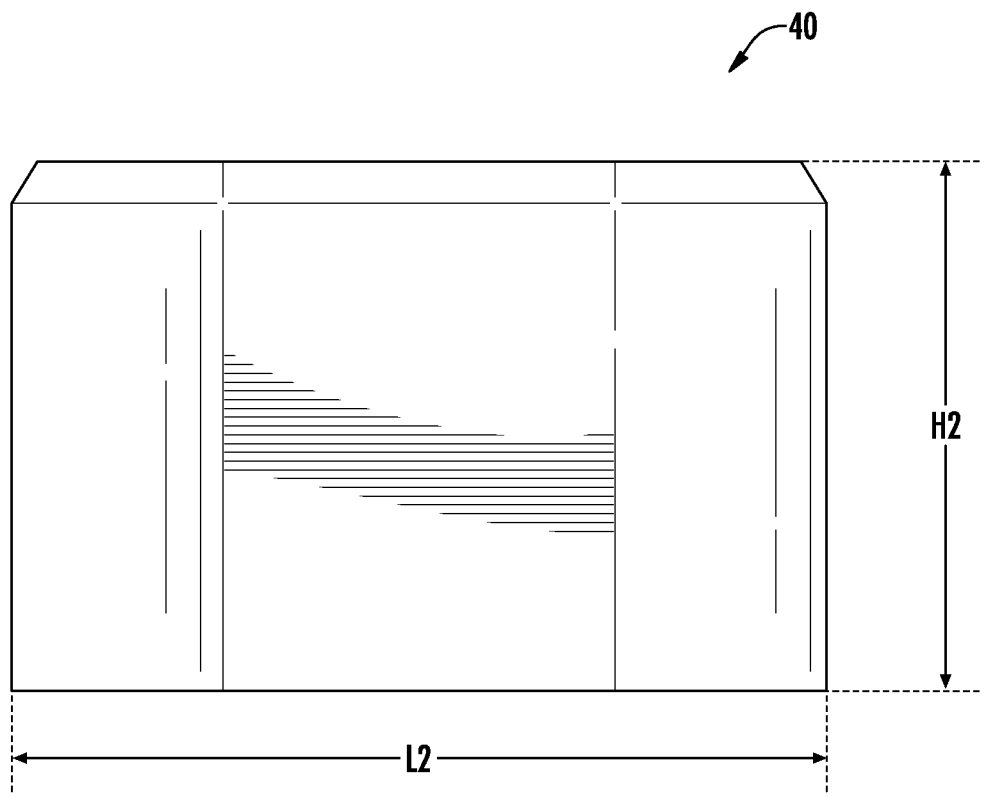
FIG. 6 is a side view of a magnetic circuit sleeve, according to an exemplary embodiment.
Figure 7:
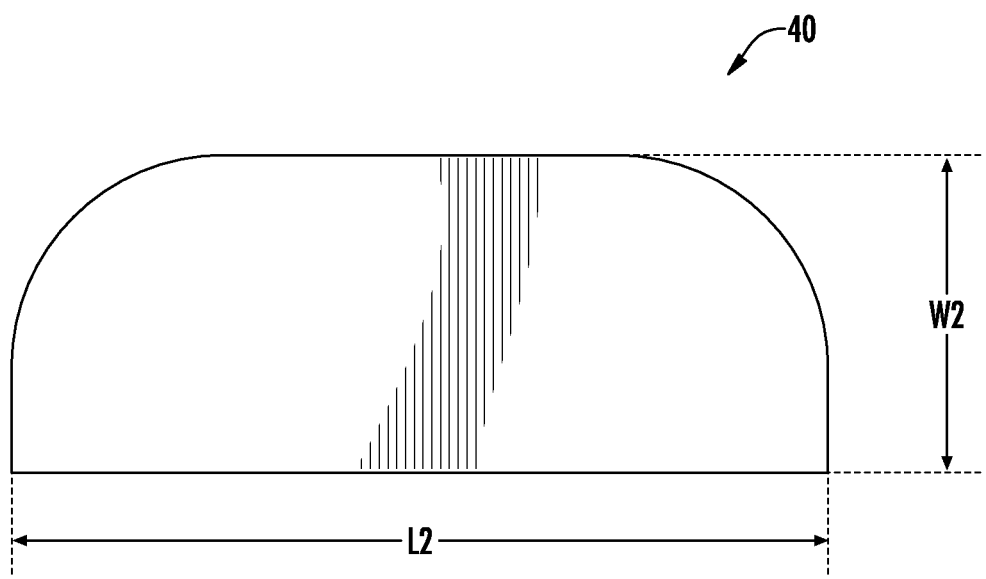
FIG. 7 is a top view of a magnetic circuit sleeve, according to an exemplary embodiment.

Referring to FIG. 6 and FIG. 7, detailed views of sleeve 40 are shown according to an exemplary embodiment. FIG. 6 shows a side elevation view, and in this embodiment, sleeve 40 includes a height, H2, and a length, L2, and as shown in FIG. 7, includes a width, W2. In various embodiments, H2 is between 0.1 and 0.4 inches, specifically between 0.2 and 0.3 inches and more specifically about 0.25 inches (e.g., 0.25 inches plus or minus 0.005 inches). In a specific embodiment, H2 is less than H1 such that the sleeves are slightly recessed below base surface 14, resulting in air gap G between sleeves 40 and 42 and workpiece 46 (show in FIG. 2). In specific embodiments, H2 is between 0.005 and 0.02 inches less than H1. In various embodiments, L2 is between 0.2 and 0.6 inches, specifically between 0.3 and 0.4 inches and more specifically about 0.385 inches (e.g., 0.385 inches plus or minus 0.001 inches). In specific embodiments, L2 is slightly larger than L1 such that a press fit is formed between the sleeves and the inner surfaces of the corresponding recess. In general, W2 is selected such that both sleeves (e.g., sleeves 40 and 42) and magnet 44 fit widthwise within recess 48.

In general, magnet 44 is sized and shaped to fit within recess 48, between sleeves 40 and 42. In general, the dimensions, volume, weight, etc. of magnet 44 are selected such that magnetic circuit 34 provides the desired level of magnetic coupling force. In various embodiments, as shown best in FIG. 1 and FIG. 2, magnet 44 has a height, H3, a width, W3 and a length, L3. In various embodiments, H3 is between 0.1 and 0.4 inches, specifically between 0.2 and 0.3 inches and more specifically about 0.25 inches (e.g., 0.25 inches plus or minus 0.001 inches). As noted above, in specific embodiments H3 is less than H2 such that magnet 44 is recessed below adjacent sleeves 40 and 42, and in specific embodiments, the difference between H3 and H2 is between 0.001 and 0.01 inches. In various embodiments, L3 is between 0.2 and 0.6 inches, specifically between 0.3 and 0.4 inches and more specifically about 0.38 inches (e.g., 0.38 inches plus or minus 0.001 inches). In specific embodiments, L3 is slightly less than both L1 and L2 such that the front and rear vertical surfaces of magnet 44 do not engage with the vertical surfaces of recess 48 upon press fit, and in a specific embodiment, the difference between L3 and L2 is less than 0.005 inches.

In various embodiments, W1 is between 0.05 and 0.2 inches, specifically between 0.1 and 0.2 inches and more specifically about 0.13 inches (e.g., 0.13 inches plus or minus 0.005 inches). As will be understood, to form a press fit within recess 48 in the widthwise direction, the sum of the width of magnet 44, W3, and the sum of the widths of the two sleeves 40 and 42 (both W2) is slightly larger than the width W1 of recess 48.

As noted above, in various embodiments, magnet 44 is sized such that each magnetic circuit generates sufficient magnet coupling force to secure the adjacent portion of level 10 to the magnetic workpiece. In addition, the total magnetic coupling force generated by all of the magnetic circuits of level 10 is sufficient to secure and firmly support level 10 from the magnetic workpiece in the vertical orientation (see FIGS. 2 and 3) and/or in a horizontal position relative to the workpiece. In various embodiments, each magnet 44 has a volume that is between 0.005 inches$^3$ and 0.3 inches$^3$, specifically between 0.01 inches$^3$ and 0.02 inches$^3$, and more specifically between 0.01 inches$^3$ and 0.015 inches$^3$. In a specific embodiment, magnet 44 has a volume of about 0.01235 inches$^3$.

In specific embodiments, the arrangement of sleeves 40 and 42 of each magnetic circuit allows each magnetic circuit to generate at least 8 lbs., and more specifically greater than or equal to 10 lbs. of magnetic coupling force, as measured when a magnetic workpiece is in contact with base surface 14. In various embodiments, magnet 44 having the dimensions and/or weights discussed herein generates a magnetic field having one or more of the following properties outside of the magnetic circuit. Applicant believes the magnetic circuit arrangements discussed herein generate this high level of magnetic coupling force, despite the relatively low quantities of magnetic material utilized in each circuit.

As will be understood, the total coupling force for a particular level design is determined by the number of magnetic circuits, each having a coupling force as discussed herein. Thus, in various embodiments, magnetic circuits 32, 34 and 36 combined generate greater than 24 lbs. of coupling force, and specifically greater than or equal to 30 lbs. of coupling force.

In various embodiments, sleeves 40 and 42 and magnet 44 may be made from any suitable material to form a magnetic circuit as discussed herein. In general, sleeves 40 and 42 can be any ferromagnetic material, such as iron, nickel, cobalt and their alloys. In a specific embodiment, sleeves 40 and 42 are made from a steel material. In general, magnet 44 may be any permanent magnetic material, and in specific embodiments, magnet 44 may be a rare-earth magnet, such as neodymium magnet or samarium-cobalt magnet. In other embodiments, magnet 44 may be formed from a non-rare earth magnetic material, such as a ferrite ceramic material or an aluminum nickel cobalt (alnico) alloy material.

Figure 8:
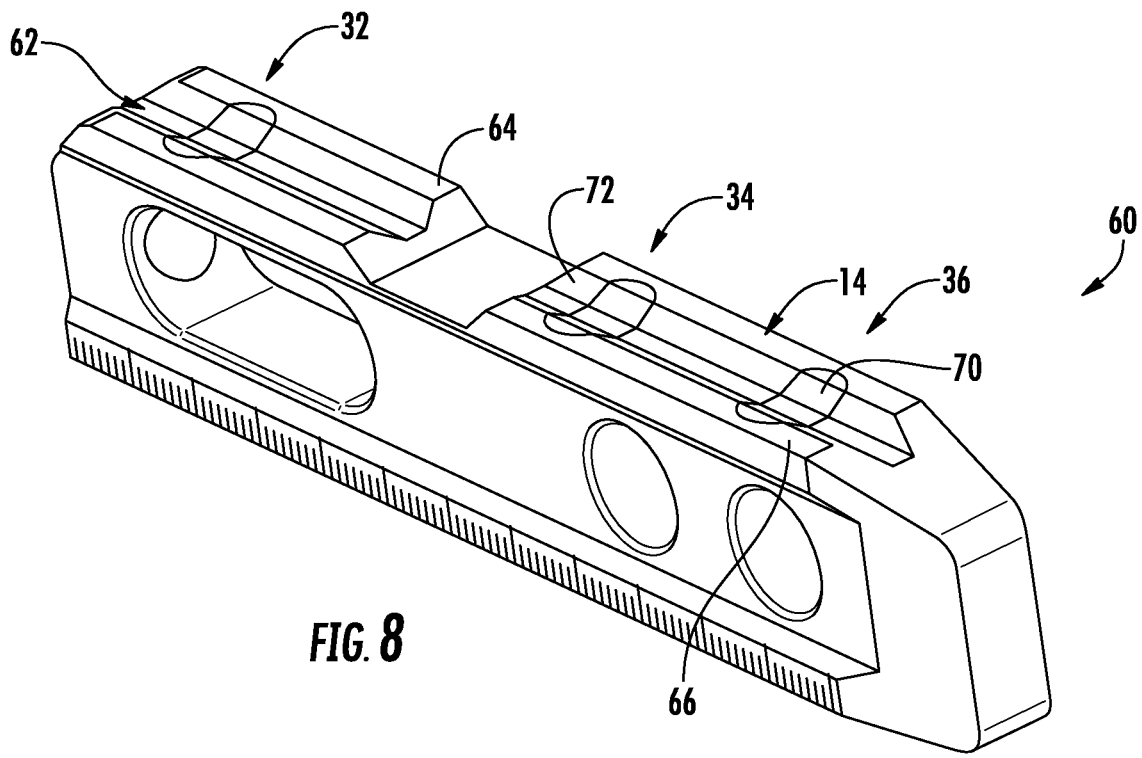
FIG. 8 is a perspective view of a level, according to another exemplary embodiment.

Referring to FIGS. 8-14, additional embodiments of levels utilizing one or more magnetic coupling elements as discussed herein are shown. FIG. 8 shows a leveling device, shown as level 60, according to an exemplary embodiment. As shown in FIG. 8, level 60 is substantially similar to level 10 except as discussed herein. Level 60 includes a longitudinal groove 62 located adjacent base surface 14, and groove 62 facilitates coupling level 60 to an elongate workpiece such as a pipe, conduit, etc. Groove 62 extends substantially the entire length of level 60, and divides base surface 14 to a left section 64 and a right section 66. Similar to level 10, level 60 includes three discreet magnetic circuits 32, 34 and 36. However, as shown in FIG. 8, circuits 32, 34 and 36 reside within groove 62 such that magnets 44 reside at or beneath a floor surface 68 of groove 62 and the sleeves include angled surfaces 70 that substantially follow the slope of the angled sidewalls 72 of groove 62.

Figure 9:
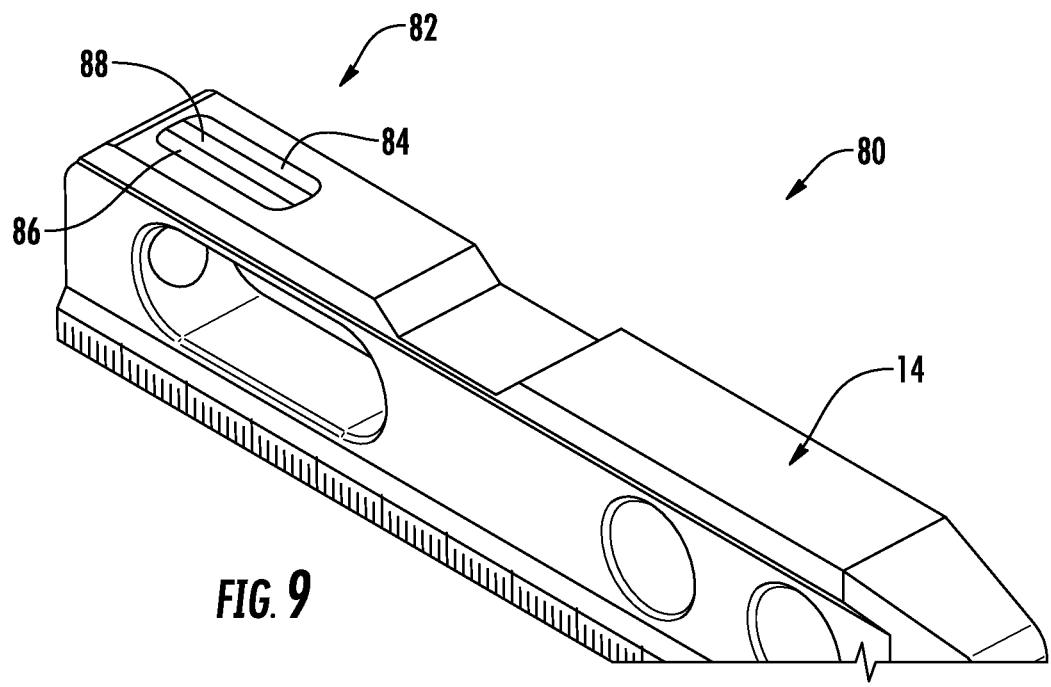
FIG. 9 is a perspective view of a level, according to another exemplary embodiment.

FIG. 9 shows a leveling device, shown as level 80, according to an exemplary embodiment. As shown in FIG. 9, level 80 is substantially similar to level 10 except as discussed herein. Level 80 includes a large or elongate magnetic coupling element, shown as magnetic circuit 82. Magnetic circuit 82 has a larger footprint than circuit 32, 34 or 36 along base surface 14. In this embodiment, magnetic circuit 82 includes first and second metal sleeves 84 and 86 positioned on either side of magnet 88. In various embodiments, the length and/or width of sleeves 84, 86 and magnet 88 are greater than those discussed above regarding circuits 32, 34 or 36, and in the specific embodiment shown, level 80 only includes a single elongate discrete magnetic circuit 82. As shown in FIG. 9, the elongated shape of sleeves 84 and 86 and of magnet 88 are such that the longitudinal axes of each component are parallel to each other, are parallel to the plane of base surface 14 and are parallel to the longitudinal axis of level 80.

Figure 10:
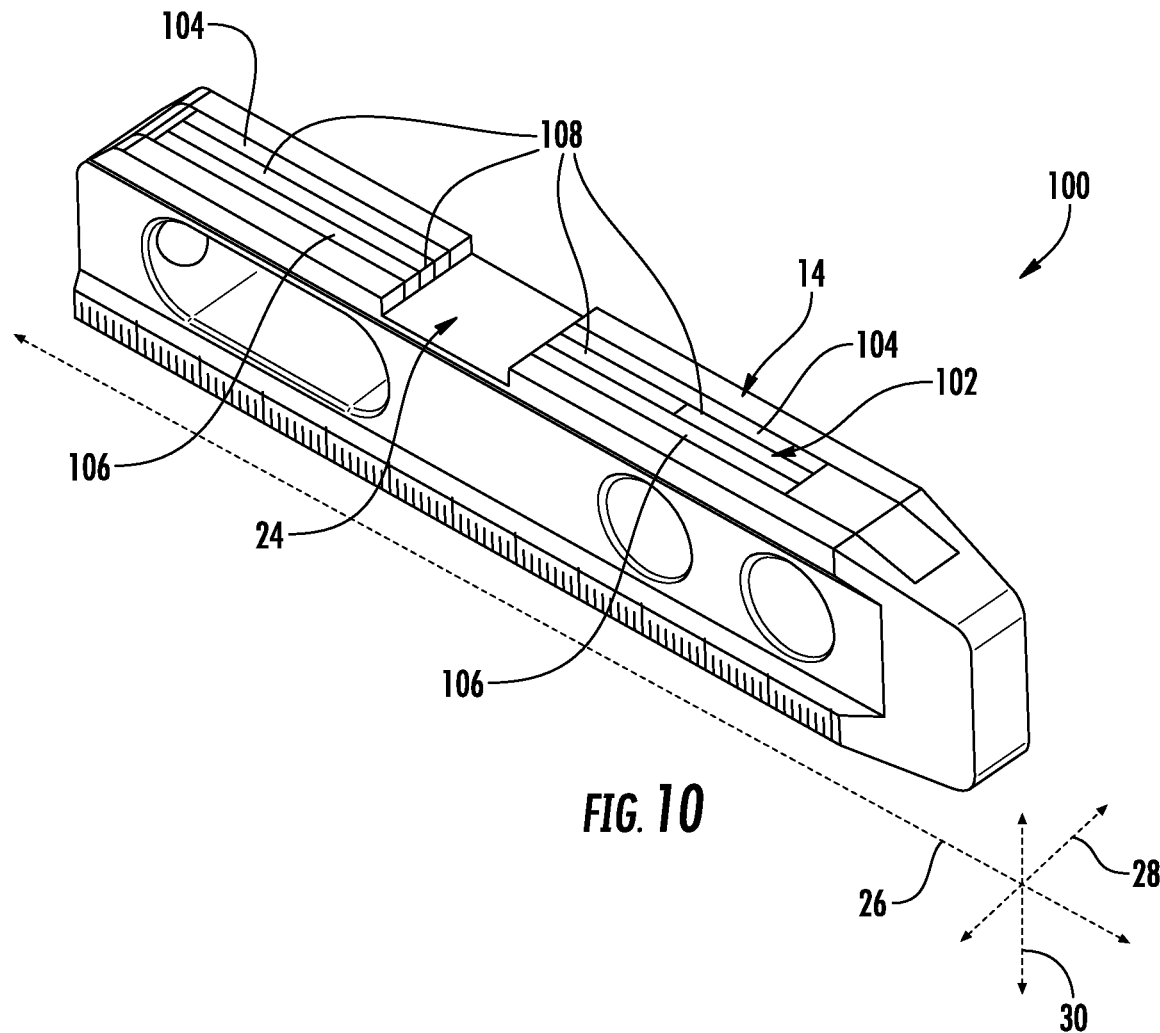
FIG. 10 is a perspective view of a level, according to another exemplary embodiment.
Figure 11:
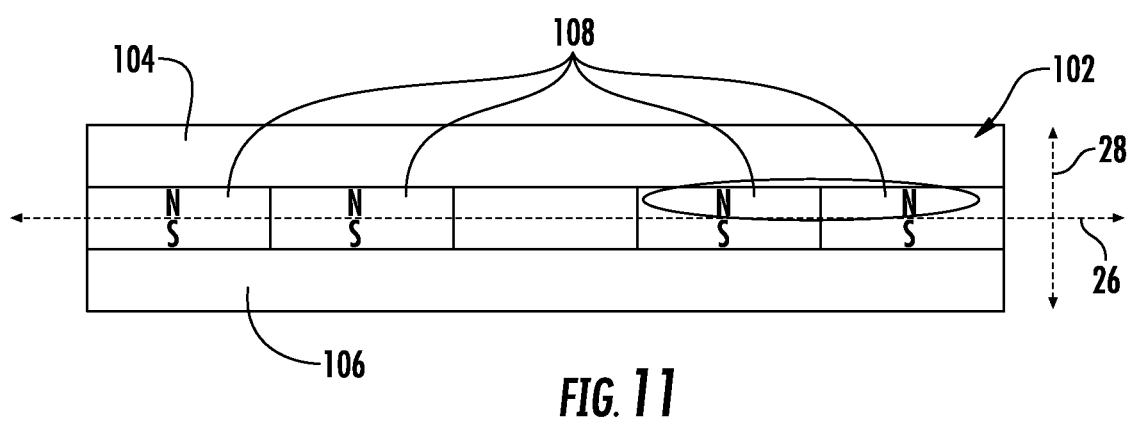
FIG. 11 is a schematic view of a magnetic circuit, according to another exemplary embodiment.

FIGS. 10 and 11 show a leveling device, shown as level 100, according to an exemplary embodiment. As shown in FIG. 10, level 100 is substantially similar to level 10 except as discussed herein. Level 100 includes an elongate magnetic coupling element, shown as elongate magnetic circuit 102, located extending along base surface 14. In various embodiments, elongate magnetic circuit 102 extends in a direction substantially parallel to the longitudinal axis 26 of level 100. In various embodiments, elongate magnetic circuit 102 extends at least 30%, and more specifically, at least 50% of the length of level 100.

Elongate magnetic circuit 102 includes an elongate left sleeve 104, an elongate right sleeve 106, and one or more magnets 108 located between sleeves 104 and 106. In general, magnetic circuit 102 operates in a manner similar to magnetic circuit 34 discussed above, and specifically, sleeves 104 and 106 are formed from a low reluctance material that acts to focus/guide the magnetic field generated by magnets 108. As shown in FIG. 11, in an exemplary embodiment, magnets 108 are discrete magnets (e.g., having a length of about 1 inch) that are arranged end to end located between sleeves 104 and 106. As shown in FIG. 10, magnetic circuit 102 may include a pair of separate metal sections forming sleeve 104, and a second pair of separate metal sections forming sleeve 106, where one section of each pair is located before the vial recess 24 and where one section of each pair is located after the vial recess 24.

Further, as shown in FIG. 11, in various embodiments, magnets 108 are arranged so that the north-south axis of at least one magnet 108 is oriented in the same direction as at least one other magnet 108 of magnetic circuit 102, and in a specific embodiment, magnets 108 are arranged so that the north-south axis of each magnet 108 is oriented in the same direction as all of the other magnets 108 of magnetic circuit 102. In addition, magnets 108 are positioned such that the north-south axis of magnets 108 are substantially perpendicular to longitudinal axis 26 (e.g., within plus or minus 10% of perpendicular). Further, in various embodiments, magnets 108 are positioned such that the north-south axis of magnets 108 are substantially parallel (e.g., within plus or minus 10% of parallel) to base surface 14 and/or to the workpiece surface engaged by base surface 14, and in a specific embodiment, magnets 108 are positioned such that the north-south axis of magnets 108 are within plus or minus 1% of parallel to base surface 14 and/or to the workpiece surface engaged by base surface 14.

Figure 12:
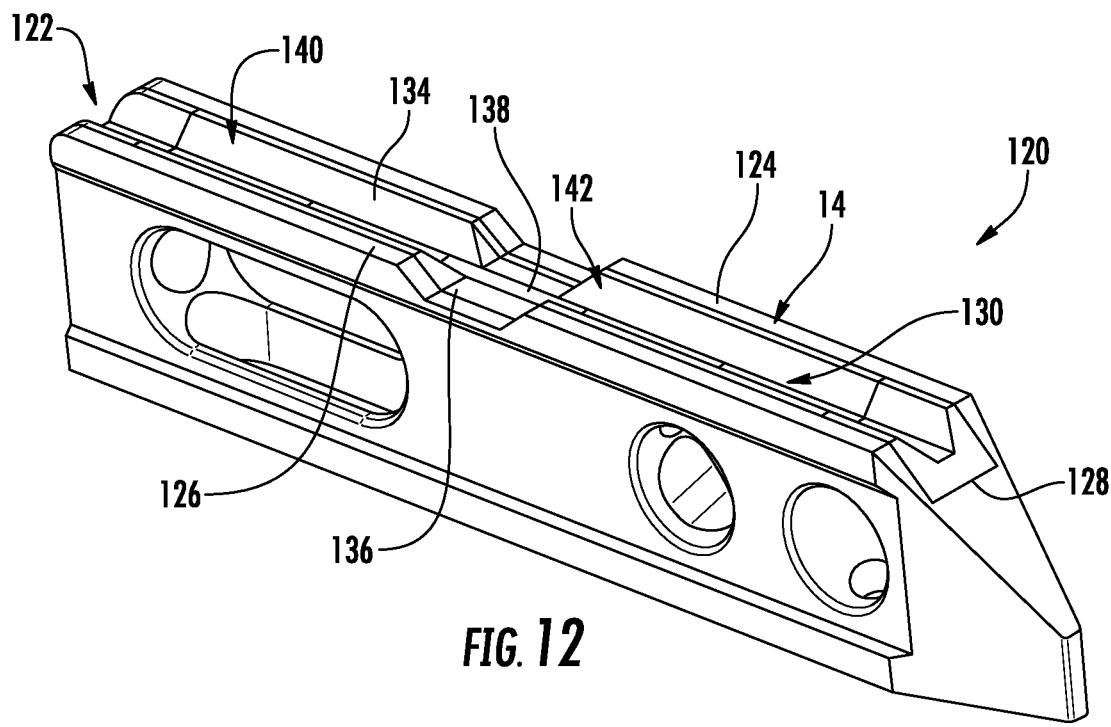
FIG. 12 is a perspective view of a level, according to another exemplary embodiment.
Figure 13:
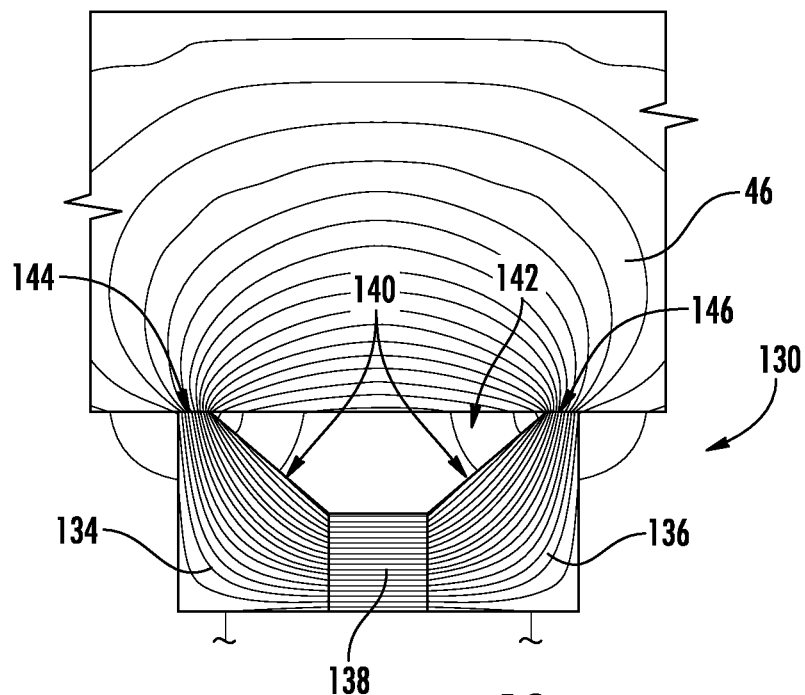
FIG. 13 is a schematic cross-section view showing the magnetic field of a magnetic circuit, according to another exemplary embodiment.

FIGS. 12 and 13 show a leveling device, shown as level 120, according to an exemplary embodiment. As shown in FIG. 12, level 120 is substantially similar to level 100, except as discussed herein. Level 120 includes a longitudinal channel 122 defined within the material of the level body and located adjacent base surface 14. Channel 122 extends substantially the entire length of level 120 and divides base surface 14 to a left section 124 and a right section 126, and is shaped to receive an elongate magnetic circuit 130, which is similar to elongate magnetic circuit 102 except as discussed herein.

As shown in FIG. 12, elongate magnetic circuit 130 resides within channel 122 such that magnets 138 reside on top of floor surface 128 of channel 122, and the sleeves 134 and 136 include angled surfaces 140 that angle outward and upward toward base surface 14. In particular embodiments, the upper surfaces of magnets 138 form a continuous or substantially continuous (e.g., continuous except for slight gaps at the end to end interface of magnet pieces) surface that extends substantially the entire length of level 120. In this arrangement, magnets 138 and the angled surfaces 140 of sleeves 134 and 136 form a generally V-shaped groove 142 that facilitates coupling of level 120 to an elongate workpiece such as a pipe, conduit, etc. In other embodiments, groove 142 may be any other shape as desired for a particular application. For example, groove may be U-shaped with a curved lower surface or may be square or rectangular in shape having a flat lower surface with perpendicular sidewalls.

Referring to FIG. 13, the guiding/focusing of the magnetic field caused by sleeves 134 and 136 is shown according to an exemplary embodiment. In this embodiment, sleeves 134 and 136 each include an outermost surface, 144 and 146 respectively, and in various embodiments, surfaces 144 and 146 are planar, flat, contact surfaces that directly engage or contact workpiece 46. In various embodiments, the width dimension (the horizontal dimension in FIG. 13) of surfaces 144 and 146 is sized to produce the desired level of focusing/guiding of the magnetic field of magnet 138. In specific embodiments, the width of sleeves 134 and 136 at a lower position adjacent to magnet 138 is greater than the width at surfaces 144 and 146, and in particular embodiments, angled surfaces 140 angle upward and outward from the wider lower portion to the narrower outer surface of sleeves 134 and 136.

Figure 14:
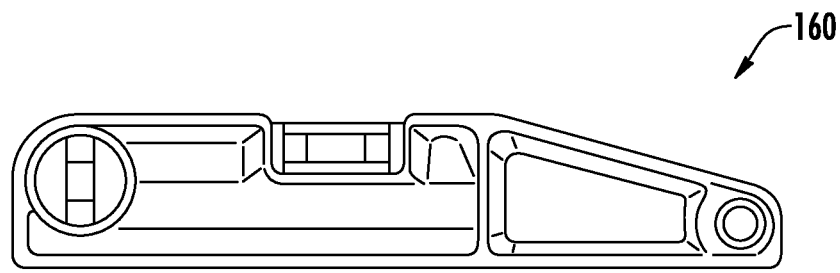
FIG. 14 is a side view of a level, according to another exemplary embodiment.

FIG. 14 shows a leveling device, shown as level 160, according to an exemplary embodiment. As shown in FIG. 14, level 160 is substantially similar to level 10 except as discussed herein. Level 160 is a block torpedo style level, and in various embodiments, may be formed from die cast metal such as aluminum. Level 160 may include any of the features of any of the embodiments, including any of the magnetic circuit embodiments, discussed herein.

Figure 15:
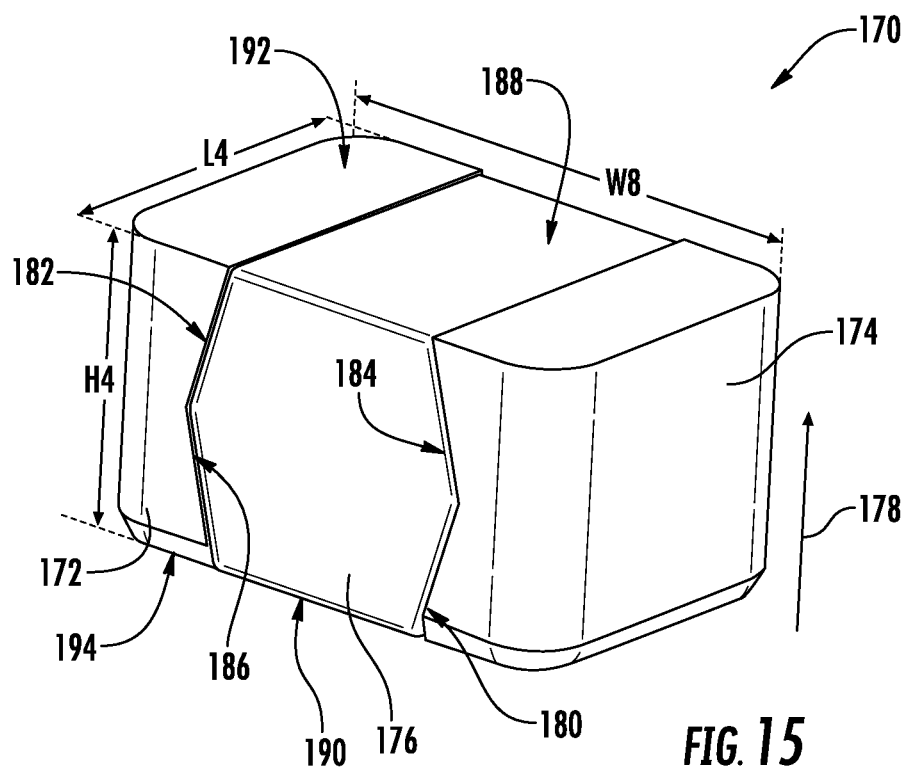
FIG. 15 is a perspective view of a magnetic circuit, according to another exemplary embodiment.

Referring to FIG. 15, a magnetic circuit 170 is shown according to an exemplary embodiment. Magnetic circuit 170 is substantially the same as magnetic circuit 34, except as discussed herein, and magnetic circuit 170 may be used to provide magnetic coupling functionality in any of the various tools and levels discussed herein.

Magnetic circuit 170 includes a pair of metallic structures, posts, blocks or sleeves, shown as left sleeve 172 and right sleeve 174, located on either side of permanent magnet 176. In general, sleeves 172 and 174 and/or magnet 176 are shaped, designed or configured to hold together magnetic circuit 170 and/or to facilitate mounting of magnetic circuit 170 into a level body recess, such as recess 48 discussed above. More specifically, the components of magnetic circuit 170 include cooperating interfacing surfaces that facilitate interlocking or frictional engagement between the components of magnetic circuit 170. This engagement/interlocking may facilitate handling and mounting of magnetic circuit 170 into the recess in the level body and may also facilitate retention of the magnetic circuit 170 in the level body.

In general, the interlocking engagement between magnet 176 and sleeves 172 and 174 is provided by at least one portion of magnet 176 being sized such that it is received within or engages with sleeves 172 and 174 such that relative movement between magnet 176 and sleeves 172 and 174 is resisted in the direction of arrow 178 (which in at least some embodiments is the direction perpendicular to base surface 14 when magnetic circuit 170 is installed in a level body). The resistance of relative motion between magnet 176 and sleeves 172 and 174 in the direction of arrow 178 acts to retain magnet 176 within the level body recess following mounting. In particular embodiments, at least one dimension, such as a width or length dimension of magnet 176, at a location between the opposing upper and lower surfaces, is greater than the corresponding dimension, such as a width or length dimension of magnet 176, at the upper and/or lower surfaces of the magnet. This structure allows the sleeves, such as sleeves 172 and 174, to have a corresponding mating shape or recess that receives or engages the larger dimension portion of magnet 176 such that magnetic circuit 170 is held together once assembled.

Figure 16:
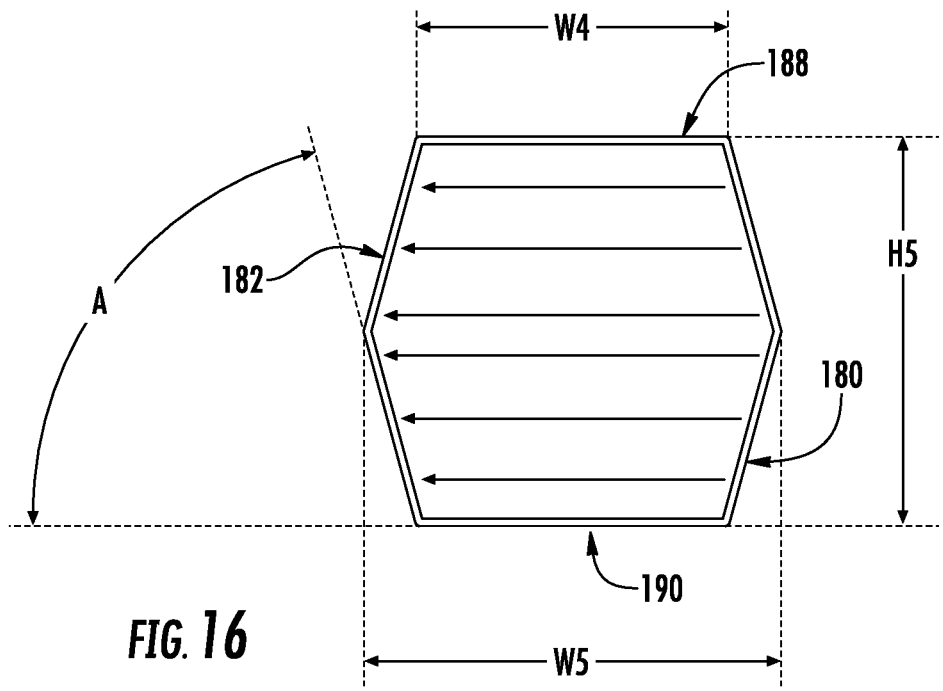
FIG. 16 is a side view of a magnet of the magnetic circuit of FIG. 15, according to an exemplary embodiment.
Figure 17:
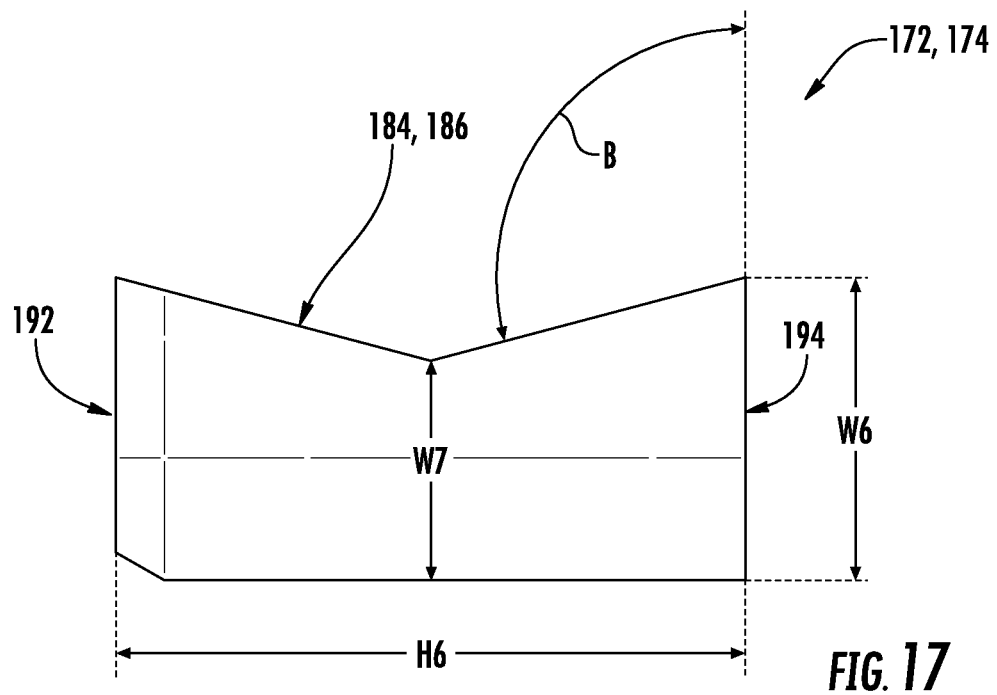
FIG. 17 is a side view of a metallic sleeve of the magnetic circuit of FIG. 15, according to an exemplary embodiment.
Figure 18:
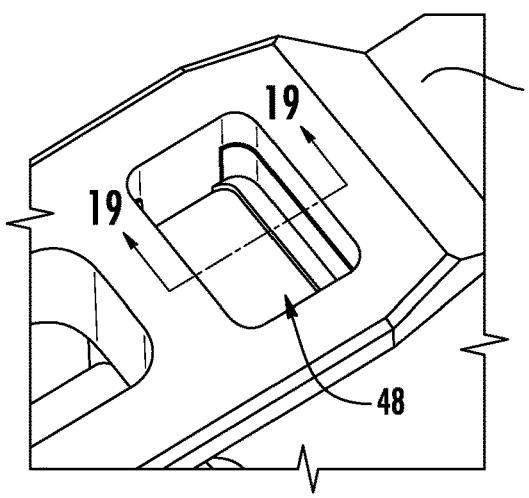
FIG. 18 is a perspective view of a portion of a level including a recess for receiving a magnetic circuit, according to an exemplary embodiment.

As shown in FIGS. 15-17, the interlocking arrangement is provided by magnet 176 having outer lateral surfaces 180 and 182 having a tapered shape, which interlocks with a corresponding and opposite tapered shape of inner sleeve surfaces 184 and 186. As shown in FIGS. 15 and 16, outer lateral surfaces 180 and 182 each include at least one section (shown as an upper section) which is angled inward (away from sleeves 172 and 174) in the direction towards upper surface 188 and a second section (shown as a lower section) which is angled inward (away from sleeves 172 and 174) in the direction towards lower surface 190. As shown in FIG. 16, the tapered shape results in width W4 of magnet 176 at surfaces 188 and at 190 being less than the width W5 at the center of magnet 176.

The tapered shape of lateral surfaces 180 and 182 is mirrored by tapered shape of inner sleeve surfaces 184 and 186. As shown in FIGS. 15 and 17, inner surfaces 184 and 186 are V-shaped relative to the upper and lower sleeve surfaces 192 and 194. Inner surfaces 184 and 186 each include at least one section (shown as an upper section) which angles inward (away from sleeves 172 and 174) in the direction towards upper surface 188 of magnet 176 and a second section (shown as a lower section) which angles inward toward (away from sleeves 172 and 174) in the direction towards lower surface 190 of magnet 176. As shown in FIG. 17, the tapered shape results in width W6 of sleeves 172 and 174 at surfaces 192 and at 194 being greater than the width W7 at the center of sleeves 172 and 174. When assembled, the maximum width portion W5 of magnet 176 aligns with the minimum width portions W7 of sleeves 172 and 174 such that the surfaces 184 and 186 of sleeves 172 and 174 extend along and contact surfaces 180 and 182 of magnet 176.

As shown in FIG. 16, outer lateral surfaces 180 and 182 form an angle A, relative to the plane of upper surface 188 or of lower surface 190. In various embodiments, angle A is greater than 10 degrees and less than 90 degrees, specifically is between 30 and 85 degrees, and more specifically is between 70 degrees and 80 degrees. In a specific embodiment, angle A is 75 degrees plus or minus 0.5 degrees. As shown in FIG. 17, inner sleeve surfaces 184 and 186 form an angle B, relative to the plane of upper surface 192 or of lower surface 194. In the embodiment shown, angle A and angle B are supplementary angles such that the sum of angles A and B is 180 degrees, and in some such embodiments, in order to have the angled interlocking shape neither angle A or B is equal to 90 degrees. In various embodiments, angle B is less than 170 degrees and greater than 90 degrees, specifically is between 150 and 95 degrees, and more specifically is between 110 degrees and 100 degrees. In a specific embodiment, angle B is 105 degrees plus or minus 0.5 degrees.

As shown in FIG. 16, the poles of magnet 176 are oriented such that the magnetic south pole is at either lateral surface 180 or 182 and the magnetic north pole is located at the other lateral surface 180 or 182. In such arrangements, the axis between the magnetic poles extends between lateral surfaces 180 and 182, and in specific embodiments, is parallel to surfaces 188 and/or 190. In this arrangement, the magnetic north and south poles are located adjacent to sleeves 172 and 174 when assembled into magnetic circuit 170, and this arrangement results in the focusing of the magnetic field of magnet 176 as discussed above and shown in FIG. 3.

Thus, in the arrangement shown in FIGS. 15-17, magnet 176 has a substantially hexagonal shape, and sleeves 172 and 174 have v-shaped surfaces 184 and 186 that engage opposing lateral surfaces of magnet 176. However, in other embodiments, magnet 176 and sleeves 172 and 174 may have a variety of other shapes that create engagement that limits or prevents relative movement as discussed herein. For example, magnet 176 may have a trapezoidal shape such that the lateral surfaces taper toward upper surface 188 and such that magnet 176 has a maximum width at lower surface 190. In other embodiments, outer lateral surfaces 180 and 182 may have projections, posts, ridges, etc. that engage with cooperating features on inner lateral surfaces 184 and 186 of sleeves 172 and 174, respectively.

Referring back to FIG. 15, the sizing of magnetic circuit 170 is shown in more detail. Magnetic circuit 170 is sized relative to a level body recess, such as recess 48, to provide an interference fit holding magnetic circuit 170 into the level body. Magnetic circuit 170 has a height, H4, a length, L4, and a width, W8. In various embodiments, H4 is between 0.2 inches and 0.3 inches and specifically is about 0.250 inches. In various embodiments, L4 is between 0.25 inches and 0.35 inches and specifically is about 0.300 inches. In various embodiments, W8 is between 0.4 inches and 0.5 inches and specifically is about 0.45 inches.

Similar to the embodiments discussed above, magnet 176 is sized such that upper magnet surface 188 is recessed slightly below upper sleeve surfaces 192. To provide this recess of magnet 176, height H5, of magnet 176, is less than height H6, of sleeves 172 or 174. In various embodiments, H5 is 6.28 mm plus or minus 0.05 mm, and H6 is 6.35 mm plus or minus 0.02 mm. In specific embodiments, magnet 176 is a neodymium magnet including a nickel plating. In specific embodiments, the plating has a thickness between 17 and 20 micrometers. In specific embodiments, magnet 176 has a minimum pull-off force of 30 N, a residual flux density (Bs) of 3.0-3.2 Kgs, density of 7.4-7.5 g/cm$^3$, hardness (Rockwell) 44-49 HRC, min radii of 0.05 mm, max operating temperature of 80 degrees C., Curie temp of 310 degrees C. minimum, coercive force (Hci) greater than 12 KOe, and maximum energy product (BH) of 40-42 MGOEe.

In specific embodiments, sleeves 172 and 174 are formed from a material (e.g., steel) having a hardness (e.g., a Rockwell hardness) greater than the hardness of magnet 176. In such embodiments, the higher hardness of sleeves 172 and 174 provides a hard, robust component for pushing equipment to apply force (such as force 214 shown in FIG. 21) against, as magnetic circuit 170 is mounted into the recess in the level body. Thus, in this arrangement, the installation force is applied to sleeves 172 and 174 rather than directly to magnet 176 during installation. In particular embodiments, sleeves 172 and 174 have a hardness (Rockwell) of 50-100 HRF and specifically of 80 HRF.

Figure 19:
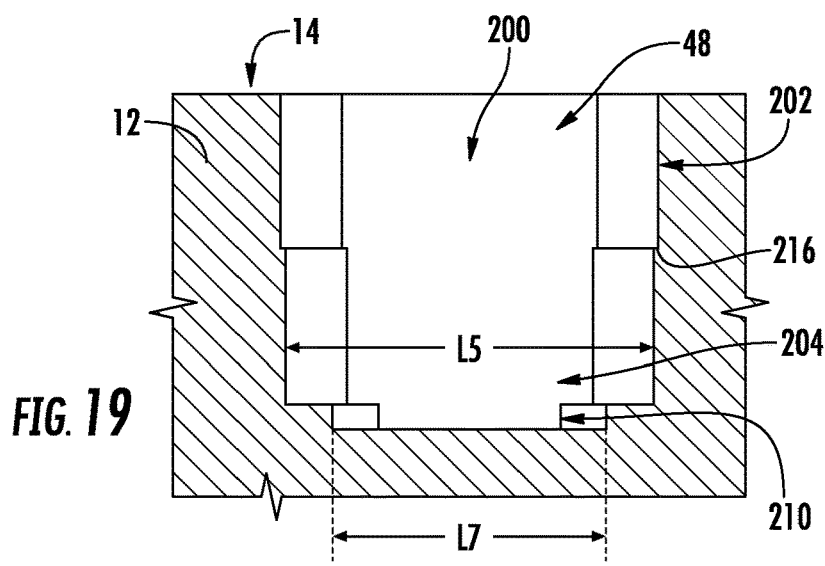
FIG. 19 is a side cross-sectional view of the level recess of FIG. 18, according to an exemplary embodiment.

Referring to FIGS. 18-21, a level body, such as level body 12, is shaped to include a recess, such as recess 48, that includes one or more structure that facilitates mounting and retention of magnetic circuit 170 in the level body. As shown in FIG. 19, recess 48 includes an upper section 200 that is sized relative to magnetic circuit 170 such that a small gap or clearance is formed between the inner surface 202 of level body 12 and the outer surface of magnetic circuit 170 within the clearance section. Recess 48 also includes a lower section 204 that is sized relative to magnetic circuit 170 such that an interference fit is formed between inner surface 202 and the outer lateral surfaces of magnetic circuit 170 within the interference section. In general, lower section 204 has at least one dimension, shown as L5, that is less than at least one dimension of magnetic circuit 170, such that an interference fit is formed with magnetic circuit 170. In the embodiment shown, surface 202 includes a constant diameter within clearance section 200 and a constant diameter within interference section 204. In this embodiment, a step or shoulder 216 is located between the clearance section 200 and interference section 204. In other embodiments, surfaces 202 may include at least one tapered section such that the dimension L5 decreases gradually along the height of recess 48.

Figure 20:
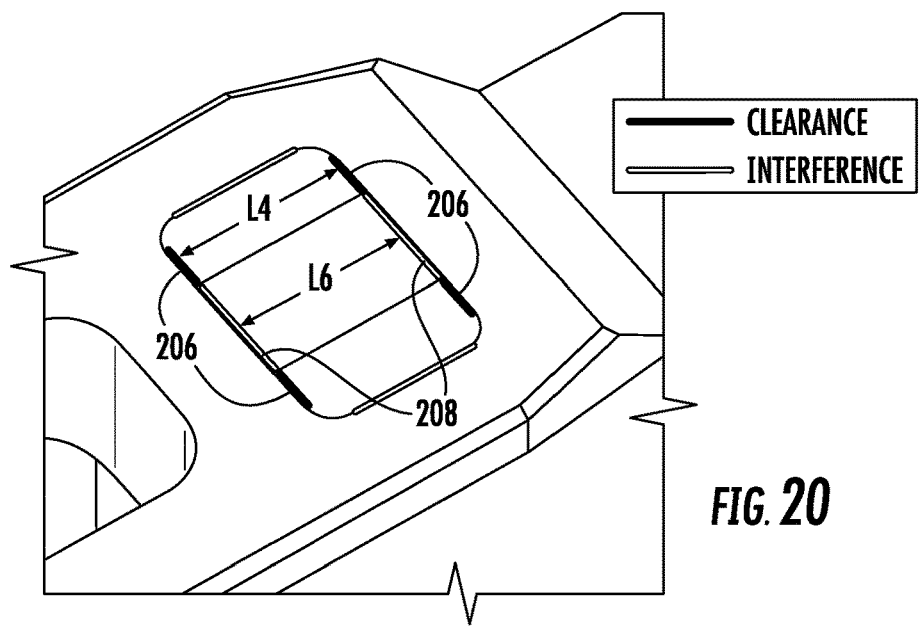
FIG. 20 is a perspective view of the magnetic circuit of FIG. 15 mounted in the recess of FIG. 18, according to an exemplary embodiment.

In particular as shown in FIG. 20, following installation of magnetic circuit 170 into recess 48, interference fit sections 206 are formed between sleeves 172 and 174 and sections of inner surface 202 within interference section 204. In particular, in this embodiment, L4 of sleeves 172 and 174 is greater than L5 of recess 48 such that the interference fit is formed. In particular embodiments, L4 is between 0.01 mm and 0.05 mm greater than L5 such that the appropriate interference fit is formed.

Further, as shown best in FIG. 20, magnet 176 has a length, shown as L6, which is less than both L4 and L5, such that clearance sections 208 are formed between magnet 176 and inner surface 202 of recess 48. This sizing allows magnetic circuit 170 to be retained (at least in part) via an interference fit with recess 48 while limiting or preventing contact between outer surfaces of magnet 176 and inner surface 202 of recess 48 which in turn limits or prevents damage to magnet 176 during insertion into recess 48.

Referring back to FIG. 19, recess 48 includes a lower recess or pocket 210. Pocket 210 is located at the lower end of recess 48 opposite from base surface 14. Pocket 210 is defined by a section of inner surface 202 that has a dimension shown as L7 that is less than L6, and has a height that is less than the height of clearance section 200 and/or interference section 204. In various embodiments, the height of pocket 210 is less than 30% of the height of recess 48, specifically less than 20% of the height of recess 48, more specifically less than 10% of the height of recess 48 and even more specifically less than 5% of the height of recess 48. In particular embodiments, pocket 210 receives a binding agent, such as epoxy, that bonds to the lower surfaces of sleeves 172 and 174 and/or magnet 176 to help retain magnetic circuit within recess 48. Thus, in such embodiments, both an interference fit and epoxy is used to hold magnetic circuit 170 within level body 12. In another embodiment, epoxy and no interference fit is used to hold magnetic circuit 170 within level body 12. In another embodiment, interference fit and no epoxy is used to hold magnetic circuit 170 within level body 12.

Figure 21:
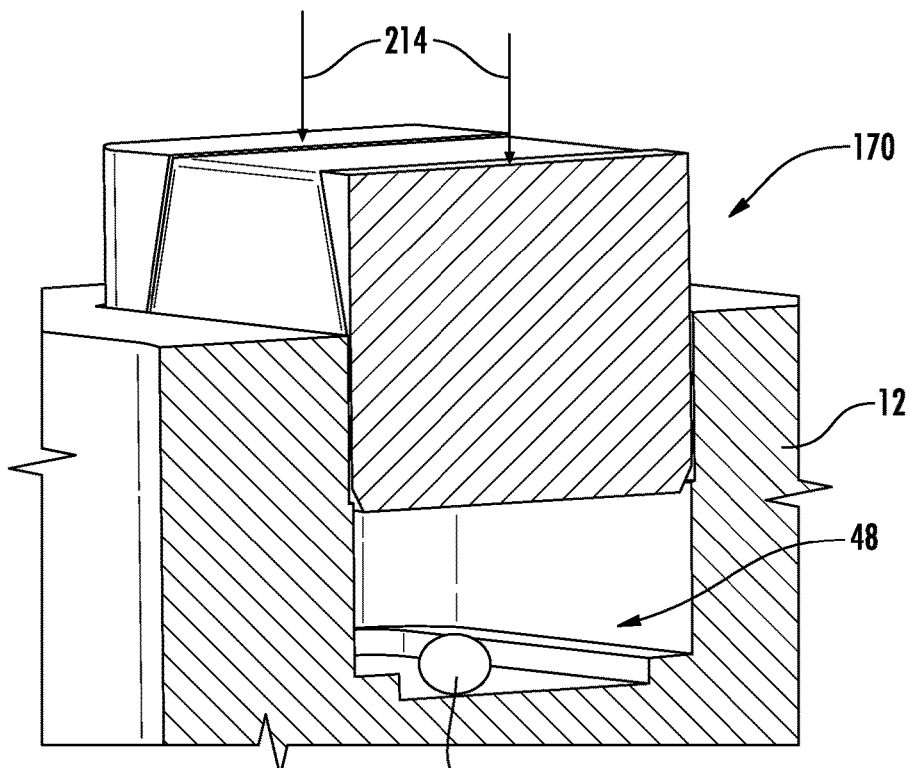
FIG. 21 shows insertion of the magnetic circuit of FIG. 15 into the recess of FIG. 18, according to an exemplary embodiment.

Referring to FIG. 21, insertion of magnetic circuit 170 into recess 48 is shown according to an exemplary embodiment. In an embodiment in which epoxy is used, an epoxy material 212 is located in recess 210. Then a force, shown as arrows 214, is applied to sleeves 172 and 174, to push magnetic circuit 170 into recess 48. In this manner, magnetic circuit 170 is installed into recess 48 without the need to apply insertion force directly onto magnet 176. As magnetic circuit 170 is moved into recess 48 an interference fit is created, and the lower surface of magnetic circuit 170 comes into contact with epoxy 212. Epoxy 212 then cures bonding to both inner surface 202 defining recess 48 and one or more surface of magnetic circuit 170.

Figure 22:
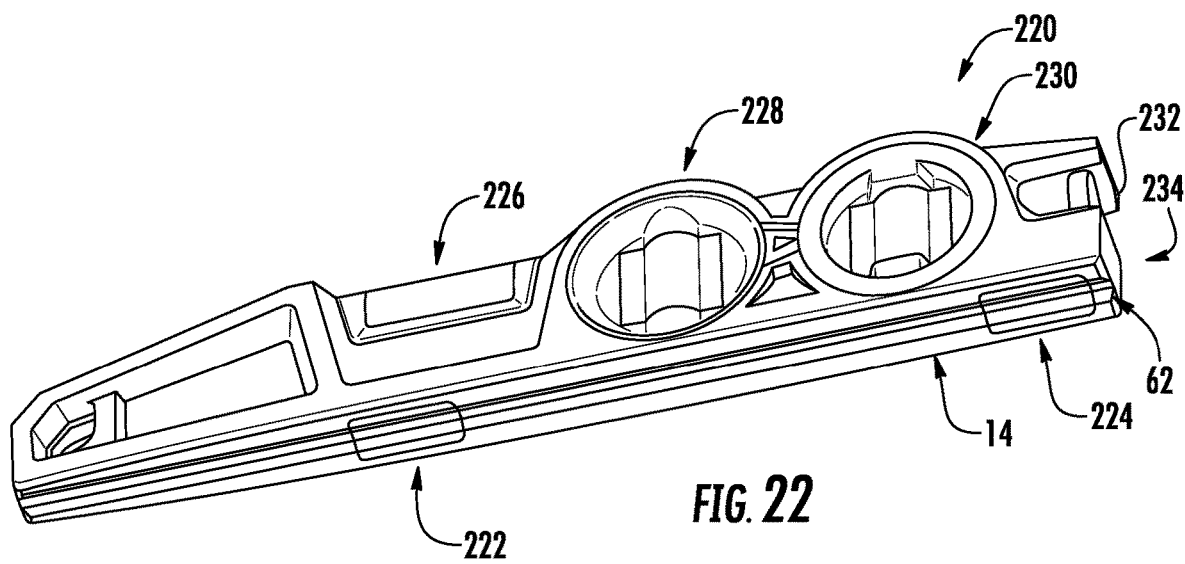
FIG. 22 is a perspective view of a magnetic circuit, according to another exemplary embodiment.

FIG. 22 shows a leveling device, shown as level 220, according to another exemplary embodiment. As shown in FIG. 22, level 220 is substantially similar to the levels discussed above, such as levels 10 and 60, except for the difference discussed or shown in the drawings. Level 220 includes a longitudinal groove 62 located adjacent base surface 14, and, as discussed above, groove 62 facilitates coupling level 220 to an elongate workpiece such as a pipe, conduit, etc. Level 220 includes two, discreet magnetic circuits 222 and 224 located within groove 62. Similar to the magnetic circuits of level 60, the outer surfaces of magnetic circuits 222 and 224 are generally shaped to follow the contours of groove 62 which facilitates engagement with the elongate workpiece.

In the specific embodiment shown in FIG. 22, level 220 includes a horizontal level vial 226, a vertical level vial 228 and a rotating level vial 230. In general, rotating level vial 230 is mounted such that level vial 230 is positionable at a number of different angles relative to base surface 14, as desired by the user of level 220. Level 220 includes a break or lock 232, such as friction lock, that engages rotating level vial 230 to hold or fix rotating level vial 230 in the desired position selected by the user.

Magnetic circuits 222 and 224 are positioned along base surface 14 within groove 62 to facilitate coupling of level 220 to a workpiece. Specifically, in the embodiment shown, magnetic circuit 222 is located below (e.g., along an axis perpendicular to base surface 14) at least a portion of horizontal level vial 226, and magnetic circuit 224 is located along base surface 14 located, at least in part, between rotating level vial 230 and the end 234 of the level that includes lock 232.

Figure 23:
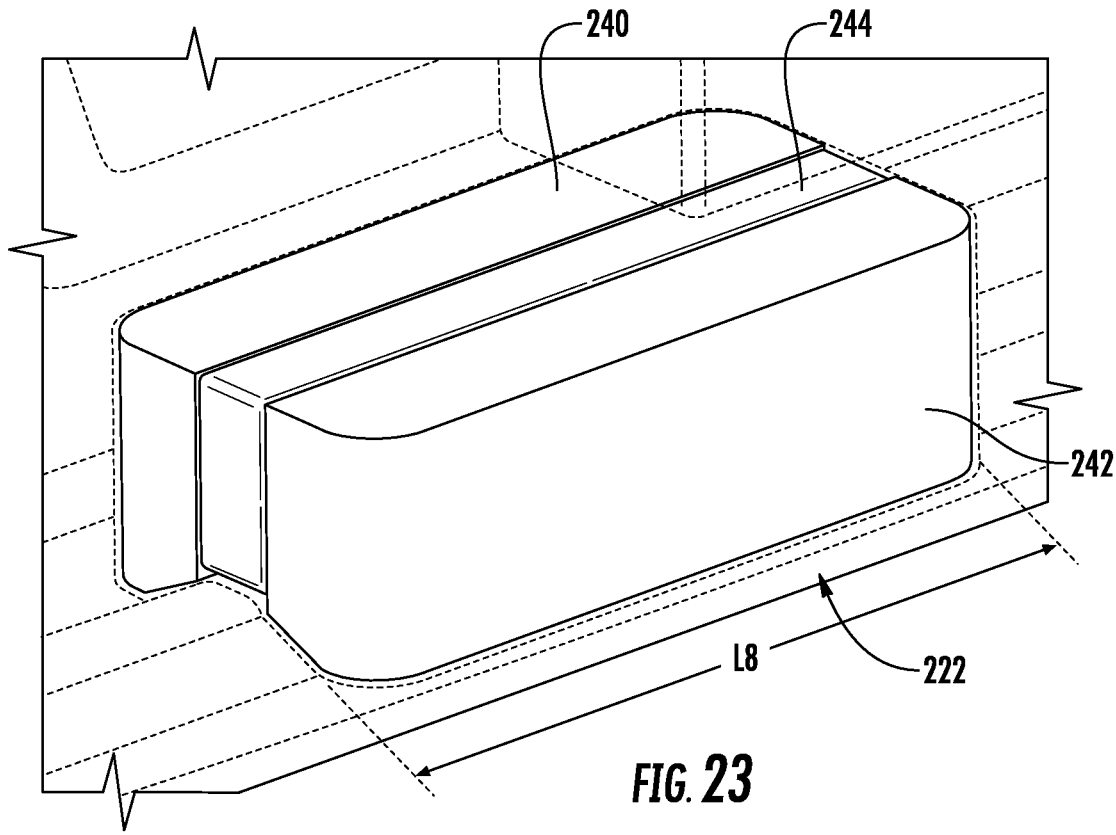
FIG. 23 is a detailed view of the magnetic circuit of the level of FIG. 22 located within a level body, according to an exemplary embodiment.
Figure 24:
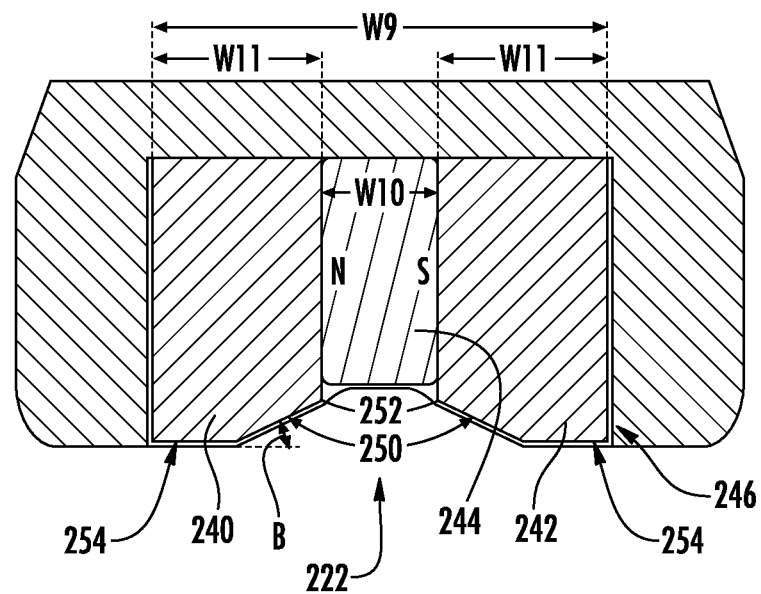
FIG. 24 is a detailed cross-sectional of the magnetic circuit shown in FIG. 23, according to an exemplary embodiment.

Referring to FIGS. 23 and 24, magnetic circuit 222 is shown in more detail. It should be understood, that while FIGS. 23 and 24 specifically show magnetic circuit 222, both magnetic circuits 222 and 224 have the same configuration, in at least some embodiments. In other embodiments however, one of magnetic circuit 222 or 224 is formed as shown in FIGS. 23 and 24, and the remaining magnetic circuit(s) are configured as one of the other magnetic circuit designs discussed herein.

As shown in FIGS. 23 and 24, magnetic circuit 222 includes a pair of metallic structures, posts, blocks or sleeves, shown as left sleeve 240 and right sleeve 242, located on either side of permanent magnet 244. In this arrangement, magnetic circuit 222 is mounted within a recess 246 formed in the body of level 220, and in a specific embodiment, an adhesive material, such as an epoxy, bonds the components of magnetic circuit 222 into recess 246. In the embodiment shown, the combined widths, W9, of sleeves 240 and 242 and magnet 244 are less than the length, L8, of magnetic circuit 222, resulting in the elongated magnetic circuit shape shown in FIGS. 23 and 24. In specific embodiments, L8 is at least twice W9 which provides level 220 with a total magnet circuit size or total magnetic coupling force large enough to support level 220 from a workpiece with two magnetic circuits. As shown in FIG. 23, the elongated shape of sleeves 240 and 242 and of magnet 244 are such that the longitudinal axes of each component are parallel to each other, are parallel to the plane of base surface 14 and are parallel to the longitudinal axis of level 220.

In addition to the elongate shape of magnetic circuit 222, magnet 244 is sized relative to sleeves 240 and 242 to provide a level magnetic field concentration and coupling force that securely attaches level 220 to a magnetic workpiece. As shown in FIG. 24, the width, W10, of magnet 244 is less than the widths, W11, of sleeves 240 and 242. In specific embodiments, W10 is less than 75% of W11, which Applicant has found results in a magnet size to magnetic circuit size that provides the desired level of magnetic field concentration (which in turn provides the desired level of magnetic coupling) while still maintaining a relatively small footprint on the base surface 14.

As shown best in FIG. 24, sleeves 240 and 242 are shaped relative to recess 246 and relative to magnet 244 to provide various magnetic coupling, magnet protection and assembly advantages as discussed herein. Sleeves 240 and 242 each include angled surfaces 250 that angle inward toward magnet 244 at an angle that matches the angle of the surfaces of channel 62. In various embodiments, angled surfaces 250 are positioned at an angle B relative to the angle of the base surface 14. In various embodiments, angle B this is between 0 degrees and 90 degrees, specifically between 10 degrees and 80 degrees and more specifically is between 20 degrees and 60 degrees. The height of magnet 244 is such that magnet is recessed a short distance below the corners 252 located between angled surfaces 250 and the inner, vertical surfaces of sleeves 240 and 242. As discussed above, this recess protects magnet 244 during level assembly and during use of the level by limiting direct contact between magnet 244 and the work piece which may crack, chip or otherwise damage magnet 244. Angled surfaces 250 angle inward from generally planar horizontal surfaces 254. Horizontal surfaces 254 are generally parallel to base surface 14 and are recessed slightly below the outer, adjacent sections of base surface 14. In uses in which level 220 is used to measure planar surface (i.e., a surface of a workpiece that is not being received in channel 62), this arrangement allows base surface 14 to contact the planar workpiece surface while limiting direct contact with sleeves 240 and 242.

It should be understood that while the disclosure herein relates primarily to leveling tools utilizing a magnetic coupling element, the magnetic coupling element embodiments discussed herein may be incorporated into a wide variety of tools that may benefit from magnetic coupling. In various embodiments, the magnetic circuits discussed herein may be utilized in screw drivers and other hand tools, protractors, combination squares, magnetic cleaning tools, sweeps, clubs, etc.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another, or with the two members and any additional member being attached to one another. Such joining may be permanent in nature or alternatively may be removable or releasable in nature. Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A level comprising:
   a level body comprising a base surface;
   at least one level indicator located within the level body;
   a cavity located in the level body defining an opening along the base surface;
   a magnetic circuit coupled to the level body within the cavity, the magnetic circuit comprising:
      a pair of metallic sleeves; and
      a permanent magnet located between opposing inner surfaces of the pair of metallic sleeves;
      wherein each of the metallic sleeves having a corner located between an angled surface and an inner vertical surface;
      wherein the each of the metallic sleeves has a width and the permanent magnet has a width;
      wherein the width of each of the metallic sleeves is greater than the width of the permanent magnet.

2. The level of claim 1, the level body formed from a first material and the pair of metallic sleeves formed from a second material.

3. The level of claim 2, wherein the second material is different from the first material.

4. The level of claim 2, wherein the second material has a magnetic reluctance that is less than a magnetic reluctance of the first material.

5. The level of claim 1, wherein the magnetic circuit has a length and wherein the length of the magnetic circuit is greater than the width of the pair of metallic sleeves combined with the width of the permanent magnet.

6. The level of claim 1, further including a groove formed in the base surface and extending in a longitudinal direction along an entire length of the base surface, the groove including a pair of longitudinally-extending surfaces positioned at an angle relative to a horizontal axis.

7. The level of claim 6, wherein the angled surface of each metallic sleeve angles inwards towards the permanent magnet at an angle matching the angle of the pair of longitudinally-extending surfaces of the groove.

8. The level of claim 7, wherein the angled surface of each metallic sleeve defines a plane at an angled position relative to the base surface.

9. A level comprising:
   a level body formed from a first metallic material, the level body comprising a base surface configured to engage a workpiece;
   at least one level indicator located within the level body;
   a groove extending in a longitudinal direction formed in the base surface; and
   a first magnetic circuit and a second magnetic circuit located within the groove, the first magnetic circuit comprising:

a first pair of metallic sleeves formed from a second metallic material; and
a first permanent magnet located between opposing inner surfaces of the first pair of metallic sleeves;
the second magnetic circuit comprising:
a second pair of metallic sleeves formed from the second metallic material; and
a second permanent magnet located between opposing inner surfaces of the second pair of metallic sleeves.

10. The level of claim 9, wherein the level indicator is a rotating level vial mounted such that the level vial is positionable at different angles relative to the base surface.

11. The level of claim 10, further including a lock that engages the rotating level vial such that the rotating level vial can be fixed in a selected position.

12. The level of claim 11, wherein the lock is a friction lock positioned at an end of the level.

13. The level of claim 12, wherein the second magnetic circuit is located along the base surface at least in part between the rotating level vial and the end of the level that includes the lock.

14. The level of claim 9, the level further including a horizontal level vial positioned in a parallel direction relative to the base surface and a vertical level vial positioned in a perpendicular direction relative to the base surface.

15. The level of claim 14, wherein the first magnetic circuit is located along an axis perpendicular to the base surface below at least a portion of the horizontal level vial.

16. The level of claim 9, wherein the second metallic material is a ferromagnetic material and is different from the first metallic material.

17. A level comprising:
a level body comprising a base surface configured to engage a workpiece;
at least one level indicator located within the level body;
a cavity located in the level body defining an opening along the base surface; and
a magnetic circuit located within the cavity, the magnetic circuit comprising:
a permanent magnet including a first outer lateral surface and a second outer lateral surface;
a first sleeve located on a first side of the permanent magnet; and
a second sleeve positioned on a second side of the permanent magnet opposite from the first sleeve.

18. The level of claim 17, the permanent magnet having a tapered shape and the first and second sleeves having inner surfaces with a corresponding opposite tapered shape such that the permanent magnet and first and second sleeves interlock.

19. The level of claim 17, wherein the first and second outer lateral surfaces of the permanent magnet each include a first section angled inwards toward an upper surface of the permanent magnet and a second section angled inwards toward a lower surface of the permanent magnet.

20. The level of claim 19, wherein a width of the permanent magnet at the upper surface and the lower surface is less than a width at a center of the permanent magnet.

* * * * *